US006806663B2

(12) United States Patent
Kusaka et al.

(10) Patent No.: US 6,806,663 B2
(45) Date of Patent: Oct. 19, 2004

(54) MOTOR DRIVING CIRCUIT

(75) Inventors: Satoshi Kusaka, Tokyo (JP); Toshiya Suzuki, Tokyo (JP); Satoshi Narumi, Tokyo (JP); Hiroyuki Tamagawa, Tokyo (JP); Masaharu Hoashi, Tokyo (JP)

(73) Assignees: Renesas Technology Corp., Tokyo (JP); Mitsubishi Electric Engineering Company Limited, Tokyo (JP)

( * ) Notice: Subject to any disclaimer, the term of this patent is extended or adjusted under 35 U.S.C. 154(b) by 0 days.

(21) Appl. No.: 10/453,738

(22) Filed: Jun. 4, 2003

(65) Prior Publication Data

US 2004/0108827 A1 Jun. 10, 2004

(30) Foreign Application Priority Data

Dec. 5, 2002 (JP) ........................................ 2002-354039

(51) Int. Cl.[7] ............................................... H02P 7/06
(52) U.S. Cl. ................... 318/254; 318/138; 318/439; 318/812; 318/650
(58) Field of Search ................................. 318/254, 138, 318/439, 812, 650

(56) References Cited

U.S. PATENT DOCUMENTS

| | | | | |
|---|---|---|---|---|
| 5,173,645 A | * | 12/1992 | Naito | .......................... 318/138 |
| 5,644,203 A | * | 7/1997 | Naito et al. | .................. 318/439 |
| 5,689,181 A | * | 11/1997 | Naito et al. | .................. 324/177 |
| 6,242,875 B1 | | 6/2001 | Kusaka et al. | .............. 318/254 |
| 6,586,902 B2 | * | 7/2003 | Gotou et al. | ................. 318/560 |
| 6,650,084 B2 | * | 11/2003 | Fujioka et al. | .............. 318/705 |
| 6,724,166 B2 | * | 4/2004 | Narumi et al. | .............. 318/439 |

FOREIGN PATENT DOCUMENTS

| | | |
|---|---|---|
| JP | 2000-287477 A | 10/2000 |
| JP | 2002-084772 | 3/2002 |

* cited by examiner

*Primary Examiner*—Rita Leykin
(74) *Attorney, Agent, or Firm*—Burns, Doane, Swecker & Mathis, L.L.P.

(57) ABSTRACT

A motor driving circuit includes an induced voltage detecting circuit for detecting induced voltages in a motor; a rotation speed/phase detecting circuit and an output matrix circuit for generating a plurality of control signals in response to the detection result of the voltage detecting circuit; a current control circuit for generating current control command values in response to the control signals; and a current detecting circuit for detecting output currents that are driving the motor, and for controlling output transistors in response to its detection result and the current control command values. The motor driving circuit can sharply reduce the driving noise of the motor with improving the efficiency of the motor drive by shaping the output currents in a sinusoidal waveform.

9 Claims, 16 Drawing Sheets

MOTOR DRIVING CIRCUIT

BACKGROUND OF THE INVENTION

1. Field of the Invention

The present invention relates to a motor driving circuit for driving a spindle motor at high efficiency with reduced noise. Such a spindle motor is applied a hard disk drive, optical disk drive, fan and the like.

2. Description of Related Art

A conventional motor driving circuit for driving a three-phase brushless spindle motor is configured such that its commutation control circuit for switching the current-supply pattern of the three-phase output currents does not switch the current-supply pattern suddenly, but softly within certain electrical angle sections an electrical angle section detecting circuit detects. The electrical angle section detecting circuit detects the sections for softly switching the current-supply pattern in response to a signal indicating that the induced voltages of the motor the induced voltage detecting circuit detects cross the motor neutral voltage, and notifies a commutation selecting circuit constituting the commutation control circuit of the sections. The commutation selecting circuit switches the current-supply pattern in response to the detection result of the induced voltage detecting circuit, and generates a control signal corresponding to the current-supply pattern after the switching with reference to the switching sections for softly switching the current-supply pattern.

In response to the control signal, the commutation control circuit gradually varies the PWM duty in the specified sections for switching the current-supply pattern to softly switch the current-supply pattern, thereby reducing the driving noise of the motor produced by the sudden changes in the output currents (see, relevant reference 1).

Relevant reference 1: U.S. Pat. No. 6,242,875 B1, FIGS. 11–19, and the descriptions of the third preferred embodiment in the specification.

With the foregoing configuration, the conventional motor driving circuit has a problem of being unable to reduce the motor driving noise effectively. This is because since it does not control the output currents of the motor directly, the waveforms of the output currents vary with the changes in induced voltage constants and the number of revolutions of the motor.

SUMMARY OF THE INVENTION

The present invention is implemented to solve the foregoing problem. It is therefore an object of the present invention to provide a motor driving circuit capable of sharply reducing the driving noise and increasing the driving efficiency of the spindle motor used for the hard disk drive, optical disk drive, fan and the like.

According to a first aspect of the present invention, there is provided a motor driving circuit including current control means for generating current control command signals from the detection result of position detecting means for detecting the position of the rotor of a motor; and current detecting means for detecting the output currents of the motor, for comparing the output currents with the current control command signals, and for controlling output means for outputting the output currents of the motor in response to its comparison result. It offers an advantage of being able to shape the output currents in a sinusoidal waveform and to reduce the motor driving noise.

According to a second aspect of the present invention, there is provided a motor driving circuit including control signal generating means for correcting phases of the detection result of position detecting means for detecting the position of the rotor of a motor with Hall elements; current control means for generating current control command signals in response to the detection result corrected; and current detecting means for detecting the output currents of the motor, for comparing the output currents with the current control command signals, and for controlling output means for outputting the output currents of the motor in response to its comparison result. It offers an advantage of being able to shape the output currents in a sinusoidal waveform and to reduce the motor driving noise.

According to a third aspect of the present invention, there is provided a motor driving circuit including control signal generating means for generating three-phase control signals, each of which corresponds to one of the phases of the three-phase motor, by correcting phases of the detection result of position detecting means for detecting the position of the rotor of a three-phase motor with Hall elements; current control means for generating current control command signals by combining the three-phase control signals; and current detecting means for detecting the output currents of the motor, for comparing the output currents with the current control command signals, and for controlling output means for outputting the output currents of the motor in response to its comparison result. It offers an advantage of being able to shape the output currents in a sinusoidal waveform and to reduce the motor driving noise.

DETAILED DESCRIPTION OF THE PREFERRED EMBODIMENTS

The invention will now be described with reference to the accompanying drawings.

Embodiment 1

Figure 1:
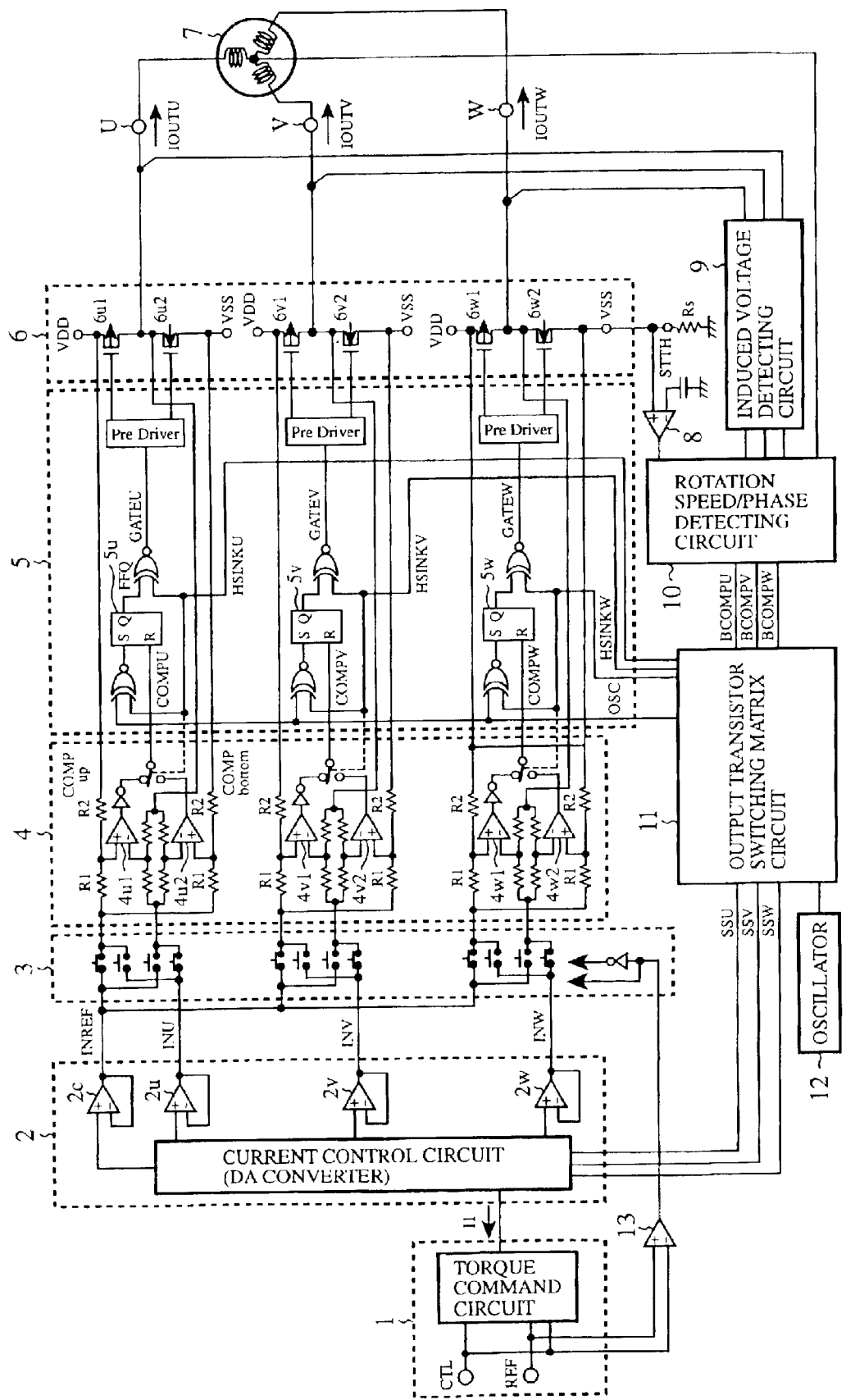
FIG. 1 is a block diagram showing a configuration of an embodiment 1 of the motor driving circuit in accordance with the present invention.
Figure 2:
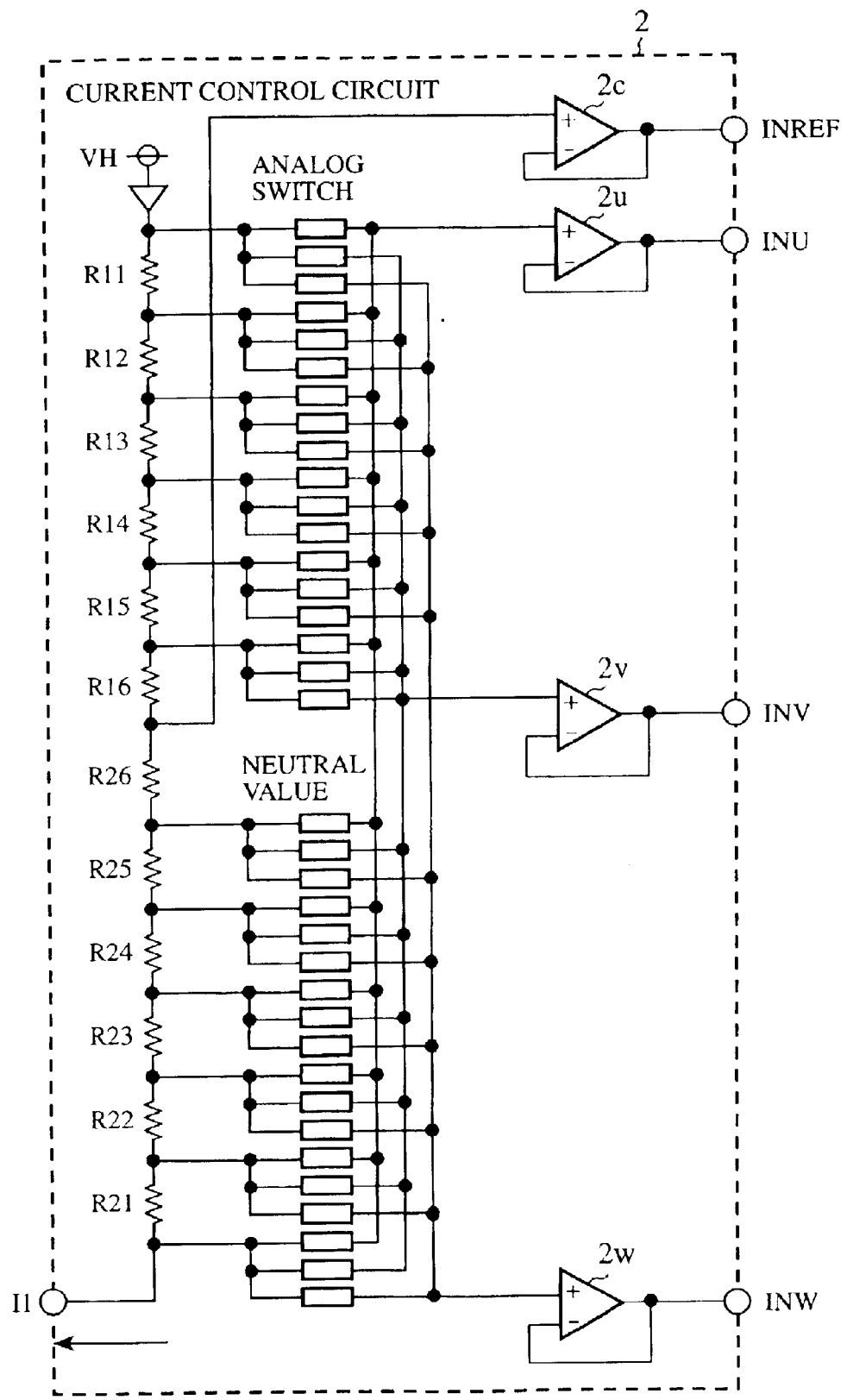
FIG. 2 is a circuit diagram showing a configuration of a current control circuit of the embodiment 1.
Figure 3:
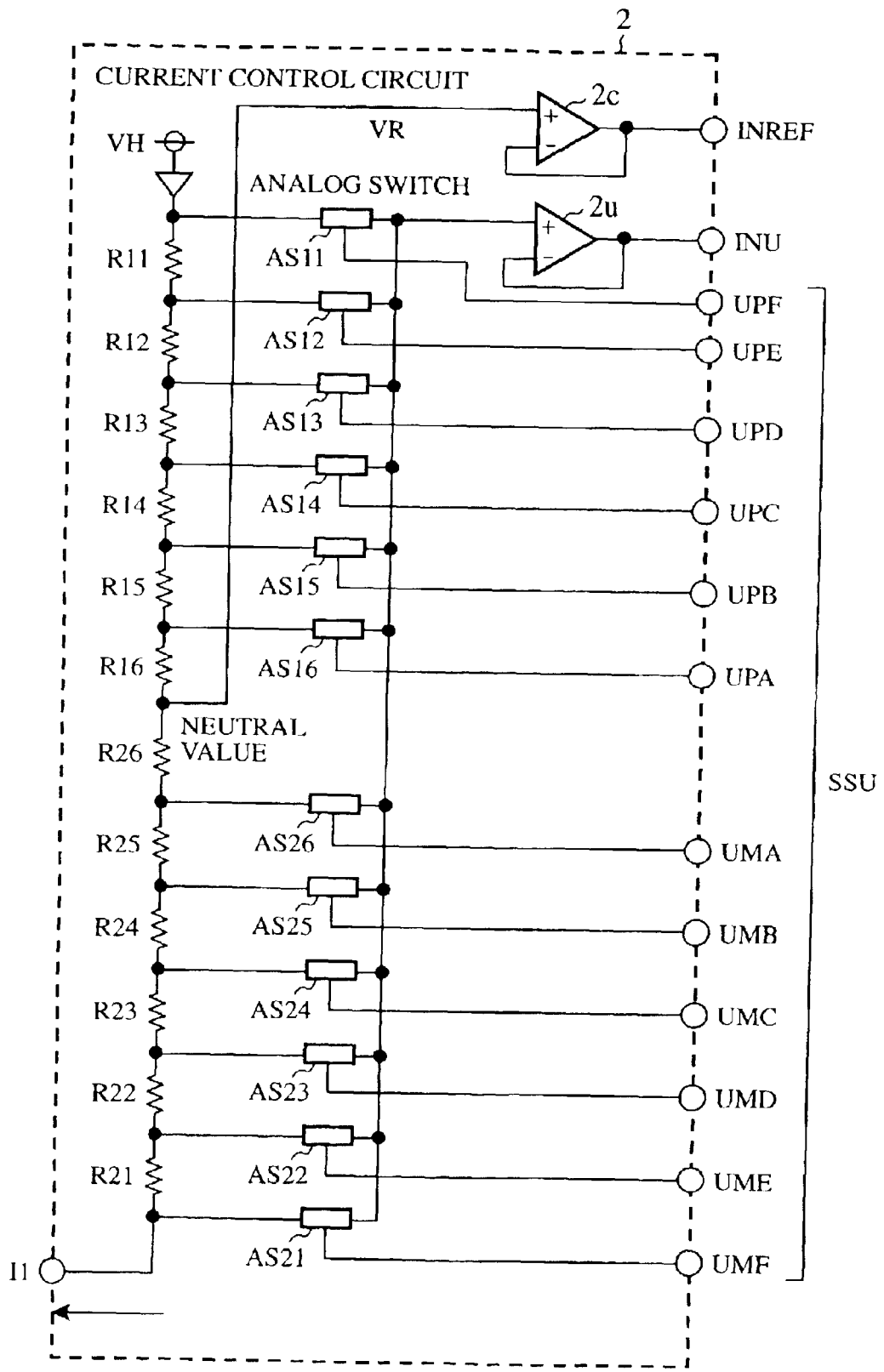
FIG. 3 is a circuit diagram showing a configuration of a portion used for generating U-phase output current of the current control circuit of the embodiment 1.

FIG. 1 is a block diagram showing a configuration of an embodiment 1 of the motor driving circuit in accordance with the present invention; FIG. 2 is a circuit diagram showing a configuration of the current control circuit of the embodiment 1; and FIG. 3 is a circuit diagram showing a configuration of a portion used for generating U-phase output current of the current control circuit of the embodiment 1. A torque command circuit 1 controls a current control circuit 2 by a torque signal I1. The current control circuit 2 is composed of a DA (digital-to-analog) converter or the like, and generates a reference value INREF and current control command values INU, INV and INW, which are used for generating and controlling three-phase output currents IOUTU, IOUTV and TOUTW for driving a motor 7.

A torque direction switching circuit 3 controls a torque direction of the motor 7 in response to a torque command signal supplied from the torque command circuit 1 or to a torque control signal CTL and reference voltage REF supplied from the outside. Specifically, it carries out switching control of the reference value INREF and the current control command values INU, INV and INW to be supplied to a current detecting circuit 4 via a comparator 13, thereby switching the rotational direction.

The current detecting circuit 4 detects the output currents IOUTU, IOUTV and TOUTW supplied from output transistors 6 to the motor 7 while it is driven. A pre-driver circuit 5 controls the switching timing of the output transistors 6 in response to control signals an output transistor switching matrix circuit 11 generates and a detection result of the current detecting circuit 4. The output transistors 6 supply the output currents IOUTU, IOUTV and IOUTW to U, V and W terminals of the motor 7 to drive it. The motor 7 is a three-phase brushless spindle motor.

A starting current detecting circuit 8 detects a current flowing through the output transistors 6 during Hall sensorless drive for starting the motor 7. An induced voltage detecting circuit 9 detects induced voltages generated in the respective phases of the motor 7 during the Hall sensorless drive. A rotation speed/phase detecting circuit 10 calculates the number of revolutions of the motor 7 and the position of its rotor in response to the detection result of the induced voltage detecting circuit 9. In response to the detection result of the rotation speed/phase detecting circuit 10, the output transistor switching matrix circuit 11 generates the control signals for generating the driving pattern for driving the motor 7. An oscillator 12 generates a reference clock signal used for operating the logic circuits constituting the output transistor switching matrix circuit 11. The comparator 13 decides the direction of the torque to be generated in the motor 7 in response to the torque command signal or the like, and controls the torque direction switching circuit 3 to switch the rotational direction of the motor 7.

Next, the operation of the present embodiment 1 will be described.

The present embodiment 1 of the motor driving circuit detects the rotor position of the motor 7 from the induced voltages generated in the motor 7 that uses the Hall sensorless driving method. Here, let us omit the description of the well-known operations such as the motor starting in the Hall sensorless drive, detection of zero-cross points in response to the motor induced voltages and motor neutral voltage, and detection of the number of revolutions of the motor. Thus, let us describe only the characteristic operation of the embodiment 1 of the motor driving circuit.

Figure 4:
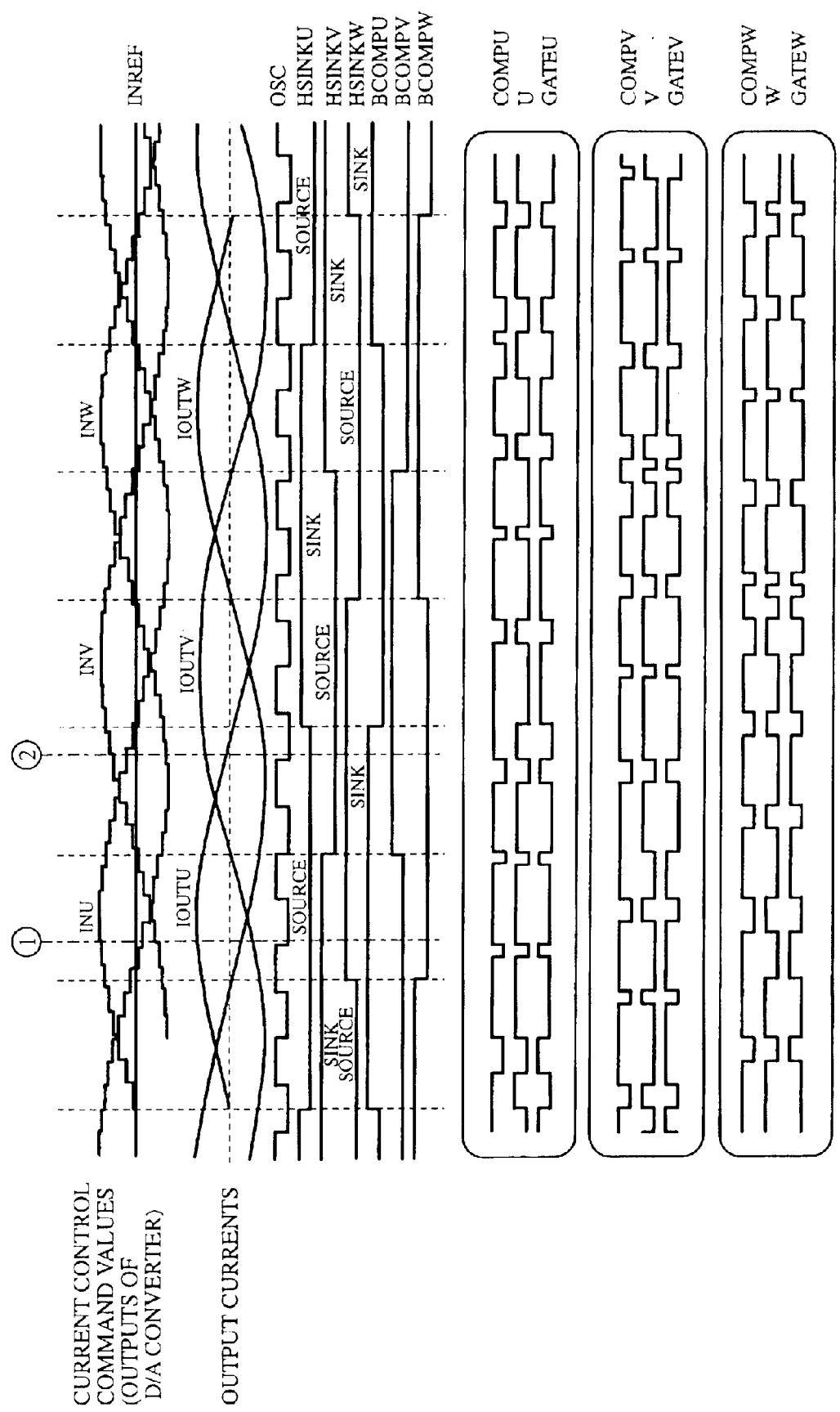
FIG. 4 is a timing chart illustrating the operation of the embodiment 1 of the motor driving circuit.
Figure 5:
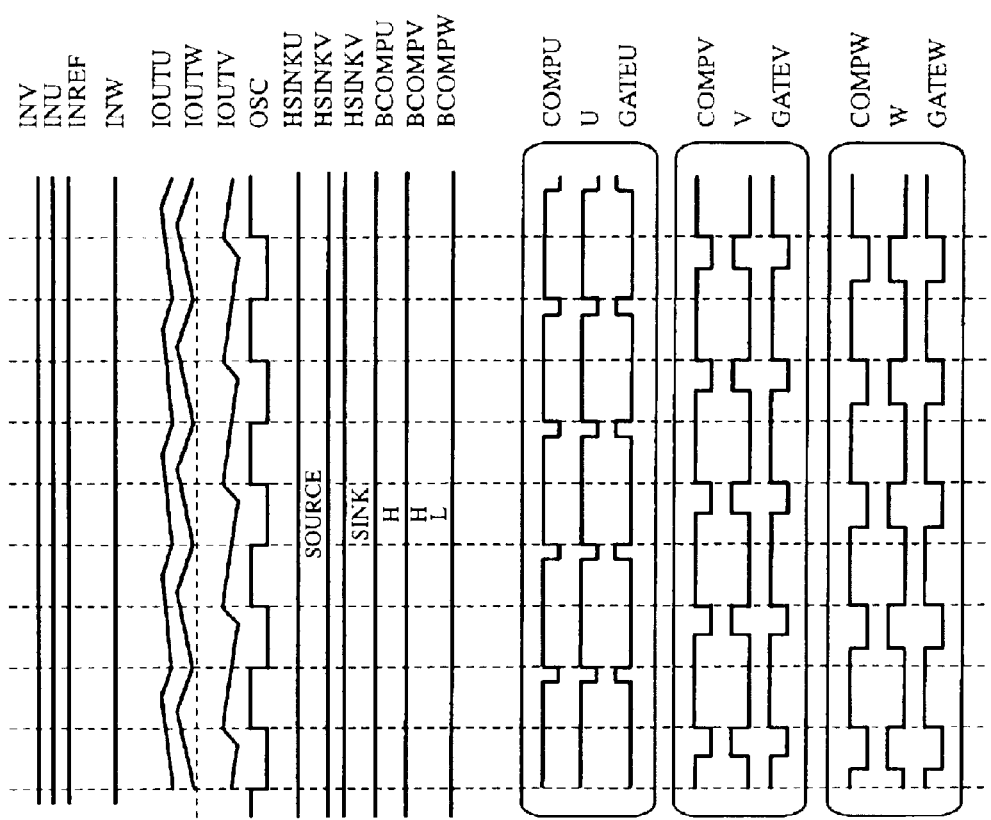
FIG. 5 is a timing chart illustrating the operation of the embodiment 1 of the motor driving circuit.
Figure 6:
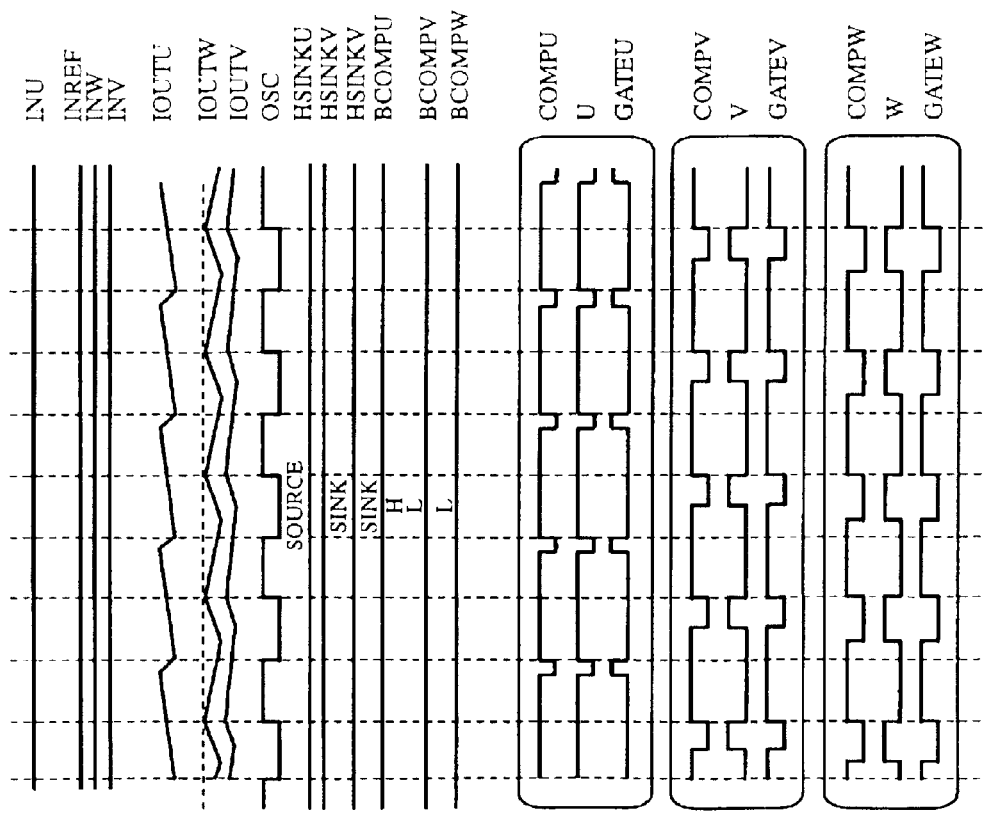
FIG. 6 is a timing chart illustrating the operation of the embodiment 1 of the motor driving circuit.
Figure 7:
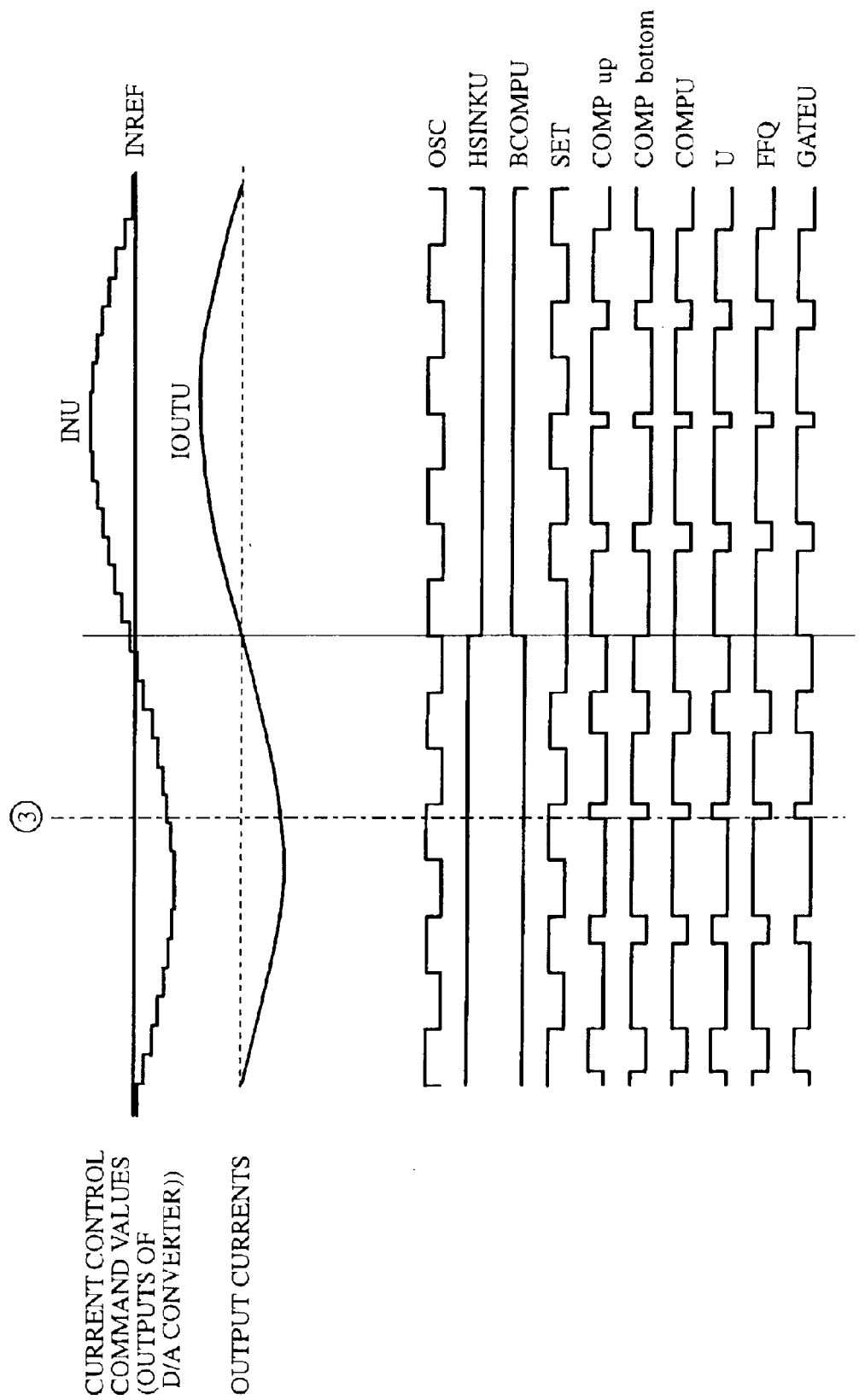
FIG. 7 is a timing chart illustrating the operation of the embodiment 1 of the motor driving circuit.
Figure 8:
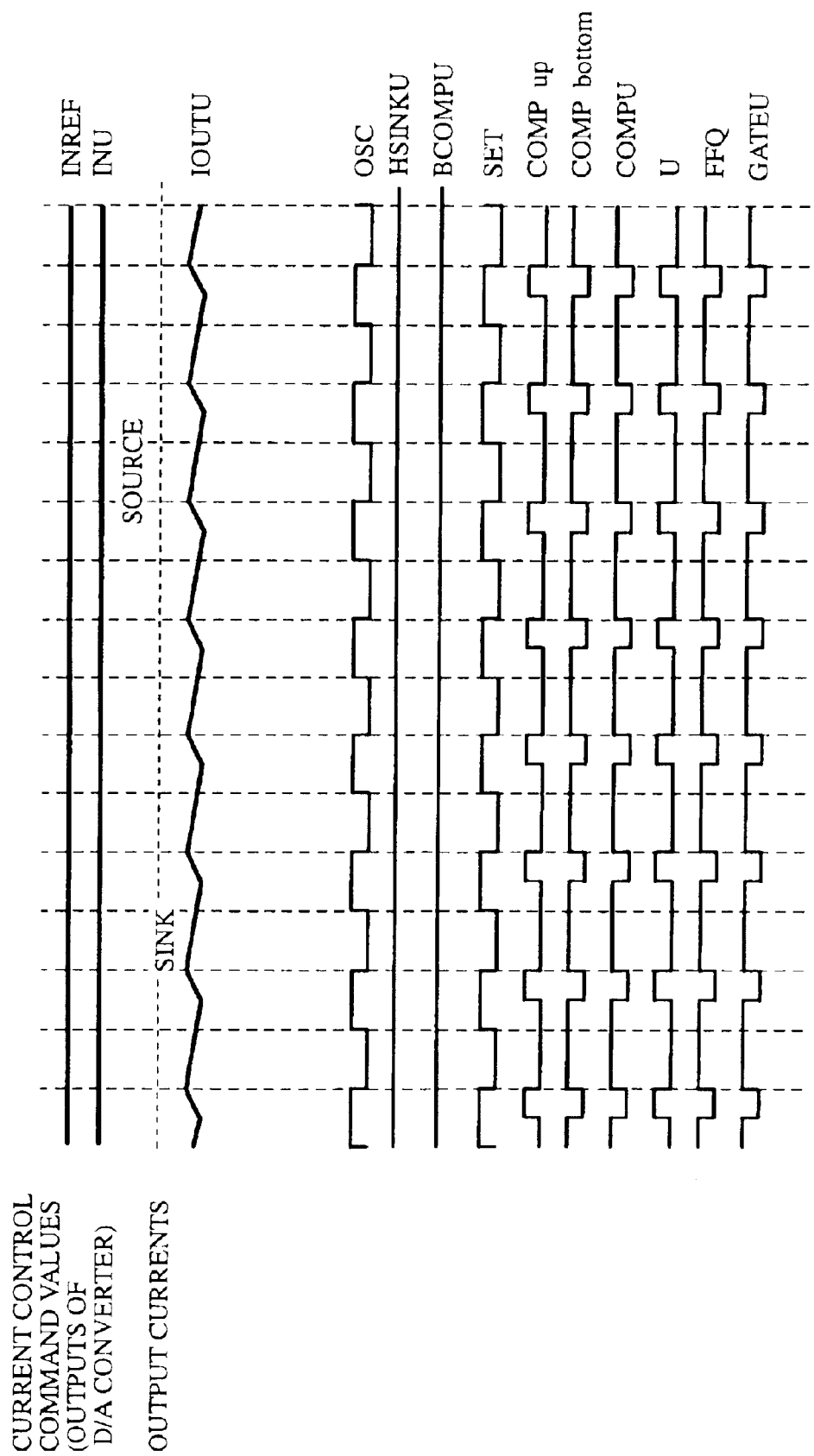
FIG. 8 is a timing chart illustrating the operation of the embodiment 1 of the motor driving circuit.
Figure 9:
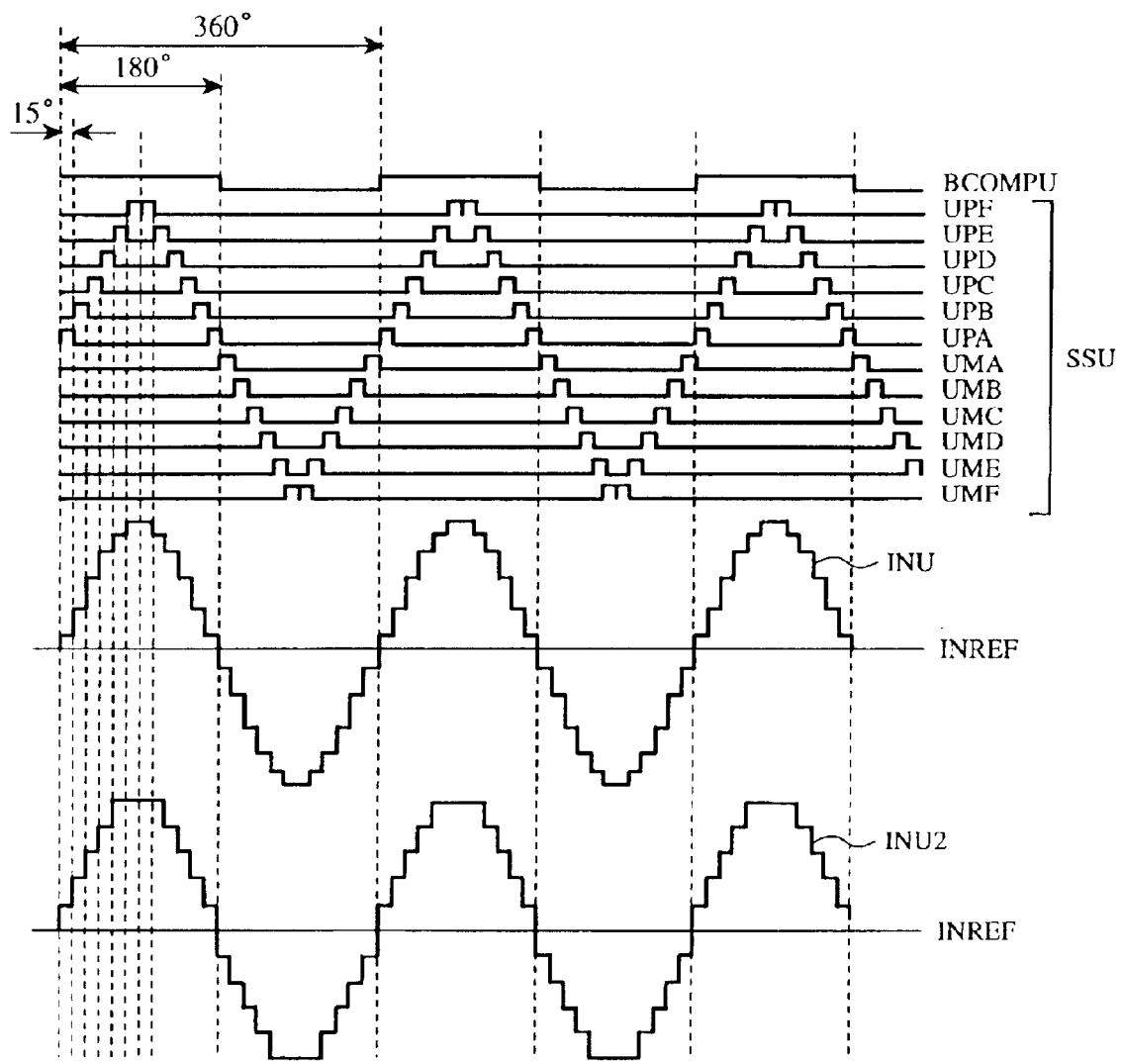
FIG. 9 is a timing chart illustrating the operation of the embodiment 1 of the motor driving circuit.

FIGS. 4–9 are timing charts each illustrating the operation of the embodiment 1 of the motor driving circuit. FIG. 5 illustrates the states of the control signals and the like at a given timing ① in FIG. 4. FIG. 6 illustrates the states of the control signals and the like at a given timing ② in FIG. 4. FIG. 7 is a timing chart illustrating the details of the signals used for controlling the U-phase output current IOUTU in FIG. 4. FIG. 8 illustrates the states of the control signals and the like at a given timing ③ in FIG. 7. FIG. 9 illustrates the states of the control signals and the like output from the current control circuit 2 of FIG. 3. Incidentally, the timing charts of FIGS. 4–9 employ the same signal names as those of the block diagram of FIG. 1.

The starting current detecting circuit 8 in FIG. 1 supplies its detection result to the rotation speed/phase detecting circuit 10. The rotation speed/phase detecting circuit 10 compares the induced voltages of the phases of the motor 7 with the motor neutral voltage, and outputs zero-cross signals BCOMPU, BCOMPV and BCOMPW indicating whether the induced voltages are increasing or decreasing when they intersect the motor neutral voltage. The timing of the zero-cross signals BCOMPU, BCOMPV and BCOMPW and other signals are illustrated in FIG. 4.

Receiving the zero-cross signals BCOMPU, BCOMPV and BCOMPW, which are generically referred to as "zero-cross signals BCOMP" from now on, the output transistor switching matrix circuit 11 generates control signals OSC, HSINKU, HSINKV and HSINKW for driving the pre-driver circuit 5. The control signals HSINKU, HSINKV and HSINKW, which are generically referred to as "control signals HSINK", are generated by inverting the logic of the zero-cross signals BCOMP as shown in the timing chart of FIG. 4.

The control signals HSINK determine the directions of the output currents that drive the motor 7. For example, the control signal HSINKU at a high level (designated by "H" from now on) causes a first output transistor 6$u$1 constituting the output transistors 6 to supply the output current IOUTU from the first power supply VDD to the U terminal of the motor 7. In contrast, the control signal HSINKU at the low level (designated by "L" from now on) causes a second output transistor 6$u$2 to pass the output current from the U terminal of the motor 7 to the second power supply VSS. Thus, it controls the pre-driver circuit 5 to pass the drive current through the motor 7.

The output transistor switching matrix circuit 11 further generates control signals SSU, SSV and SSW for driving the current control circuit 2 in response to the zero-cross signals BCOMP. The control signal SSU is a generic name of 12 signals consisting of signals UPF-UPA and signals UMA-UMF in the timing chart of FIG. 9. Likewise, the control signals SSV and SSW each consist of 12 signals though they are not shown. They vary just as the control signal SSU except that the control signal SSV lags behind the control signal SSU by a phase of 120 degrees, and the control signal SSW by a phase of 240 degrees.

The zero-cross signals BCOMP vary periodically at every 360 degrees as the zero-cross signal BCOMPU illustrated in FIG. 9. The period is inversely proportional to the number of revolutions of the motor 7. The control signal SSU is generated in synchronism with the zero-cross signal BCOMPU as illustrated in FIG. 9. Likewise, although not shown in the drawings, the control signals SSV and SSW are generated in synchronism with the zero-cross signals BCOMPV and BCOMPW, respectively.

Next, the control signal generating operation by the output transistor switching matrix circuit 11 will be described. First, it detects the total of six rising and falling edges of the zero-cross signals BCOMPU, BCOMPV and BCOMPW as the zero-cross points. Then it counts the duration from the zero-cross point to the next zero-cross point, and generates the signals UPA-UPF and UMA-UMF at the timing in accordance with the count value.

The operation of the output transistor switching matrix circuit 11 and current control circuit 2 will now be described by way of example of the U-phase output current control. The output transistor switching matrix circuit 11 brings the signal UPA to "H" at the rising edge of the zero-cross signal BCOMPU, followed by bringing the signals to "H" in the sequence of UPB→UPC→UPD→UPE→UPF with delaying their phases every 15 degrees as illustrated in FIG. 9. The signals UPA-UPF are each maintained at "H" for the duration corresponding to the phase of 15 degrees, returning to "L" thereafter. As for the signal UPF, it is brought to "H" for the interval corresponding to the phase of 15 degrees, and then for another interval corresponding to the phase of 15 degrees. Subsequently, the signals are sequentially made "H" for the interval corresponding to the phase of 15 degrees in the order of UPE→UPD→UPC→UPB→UPA with delaying their phases every 15 degrees.

Likewise, the output transistor switching matrix circuit 11 brings the signals to "H" in the sequence of UMA→UMB→UMC→UMD→UME→UMF at every 15 degree interval beginning from the falling edge of the zero-cross signal BCOMPU. Then, it places the signal UMF at "H" for the phase of 15 degree, and then for another phase of 15 degree, followed by bringing the signals to "H" in the order of UMF→UME→UMD→UMC→UMB→UMA, thereby generating them.

The control signal SSU the output transistor switching matrix circuit 11 generates in this way designates the waveform and phase of the U-phase output current to be supplied to the transistors 6, and is supplied to the current control circuit 2 as shown in FIG. 1. More specifically, the signals UPA-UPF and UMA-UMF as illustrated in FIG. 9 are supplied to the current control circuit 2 as shown in FIG. 3. As mentioned above, FIG. 3 shows a part of the current control circuit 2 of FIG. 1, which generates and controls the U-phase output current. The current control circuit 2 of FIG. 3 includes a plurality of resistors R11–R16 and R21–R26 connected in series. The resistor R11 is supplied with a voltage VH at its first terminal. The resistor R11 has the same resistance as the resistor R21, and the resistor R12 has the same resistance as the resistor R22. Likewise, the resistors R13, R14, R15 and R16 have the same resistances as the resistors R23, R24, R25 and R26, respectively.

The resistor R11 has its first terminal, to which the voltage VH is applied, connected to an analog switch AS11. The connection between the resistors R11 and R12 is connected to an analog switch AS12. Likewise, the connections of the resistors R12 and R13, R13 and R14, R14 and R15, R15 and R16, R26 and R25, R25 and R24, R24 and R23, R23 and R22, and R22 and R21 are connected to analog switches AS13, AS14, AS15, AS16, AS26, AS25, AS24, AS23 and AS22, respectively. In addition, the resistor R21 has its second terminal, from which the current I1 is output, connected to an analog switch AS21.

The analog switch AS11, which has its first terminal connected to the first terminal of the resistor R11 and supplied with the voltage VH, and its second terminal connected to a voltage follower 2u, is turned on and off by the signal UPF. The analog switch AS12, which has its first terminal connected to the connection of the resistors R11 and R12, and its second terminal connected to the voltage follower 2u, is turned on and off by the signal UPE. Likewise, the analog switch AS13, which is connected to the connection of the resistors R12 and R13, is turned on and off by the signal UPD. The analog switch AS14, which is connected to the connection of the resistors R13 and R14, is turned on and off by the signal UPC. The analog switch AS15, which is connected to the connection of the resistors R14 and R15, is turned on and off by the signal UPB. The analog switch AS16, which is connected to the connection of the resistors R15 and R16, is turned on and off by the signal UPA. The analog switch AS26, which is connected to the connection of the resistors R26 and R25, is turned on and off by the signal UMA. The analog switch AS25, which is connected to the connection of the resistors R25 and R24, is turned on and off by the signal UMB. The analog switch AS24, which is connected to the connection of the resistors R24 and R23, is turned on and off by the signal UMC. The analog switch AS23, which is connected to the connection of the resistors R23 and R22, is turned on and off by the signal UMD. The analog switch AS22, which is connected to the connection of the resistors R22 and R21, is turned on and off by the signal UME. The analog switch AS21, which is connected to the second terminal of the resistor R21, is turned on and off by the signal UMF. All these analog switches AS11–AS26 are connected to the voltage follower 2u.

The voltage follower 2u generates the current control command value INU to be output from the current control circuit 2 in response to the voltages supplied from the analog switches. The connection of the resistors R16 and R26 is connected to a voltage follower 2c. The voltage follower 2c outputs the voltage at the connection of the resistors R16 and R26 as a neutral value to be output from the current control circuit 2 as the reference value INREF.

The control circuit 2 as shown in FIG. 3, which receives the signals UPA-UPF and UMA-UMF, generates the voltage control command value INU with a voltage waveform as illustrated in FIG. 9 from the voltages the resistors R11–R16 and R26–R21 connected in series generate. The voltage command value INU has the reference value INREF as its central value, and has a voltage amplitude proportional to the magnitude of the current flowing through the resistors R11–R16 and R26–R21 connected in series. The current is the torque signal I1 controlled by the torque command circuit 1. Thus, the torque command circuit 1 controls the voltage amplitude of the voltage command value INU or the output currents IOUTU.

Although FIG. 3 shows only the portion controlling the U-phase output current in the current control circuit 2, the portions controlling the V- and W-phases in the current control circuit 2 are configured in the same manner as shown in FIG. 2. As shown in FIG. 2, the current control circuit 2 generates the current control command values INU, INV and INW that control the U-, V- and W-phase output currents IOUTU, IOUTV and IOUTW using the same resistors R11–R16 and R21–R26. A set of 12 analog switches are provided for each of the current control command values INU, INV and INW to be connected to the connections between resistors connected in series. The magnitudes of the output currents IOUTU, IOUTV and IOUTW are each controlled in response to the torque signal I1 the torque command circuit 1 outputs.

Although not shown in FIG. 2, the individual analog switches are turned on and off by the control signals SSU, SSV and SSW. Specifically, the control signal SSU consisting of the signals UPA-UPF and UMA-UMF controls the switching of the U-phase analog switches. Likewise, the control signals SSV and SSW, each consisting of the signals UPA-UPF and UMA-UMF, control the switching of the V- and W-phase analog switches. The V-phase analog switches controlled by the control signal SSV have their first terminals connected to the specified resistors, and their second terminal connected to a voltage follower $2v$. Likewise, the W-phase analog switches controlled by the control signal SSW have their first terminals connected to the specified resistors, and their second terminal connected to a voltage follower $2w$. The voltage follower $2v$ outputs the current control command value INV, and the voltage follower $2w$ outputs the current control command value INW.

Thus generating the current control command values INU, INV and INW for controlling the U-, V- and W-phase output currents IOUTU, IOUTV and IOUTW by using the same resistors R11–R16 and R21–R26 connected in series can improve the pairing characteristics of the current control command values INU, INV and INW.

Although the present embodiment 1 of the motor driving circuit is described by way of example that generates in response to the signals UPA-UPF and UMA-UMF, the current control command value INU representing a half wave of the output current for driving the motor 7 in six steps, this is not essential. For example, it becomes possible to further increase the resolution of the current control command value INU by increasing the number of the resistors connected in series and the number of signals UPA-UPF and UMA-UMF to reduce the phase difference between the signals to less than 15 degrees. The current control command values INV and INW can be generated in the same way. The current control command values INU, INV and INW and reference value INREF the current control circuit 2 generates are supplied to the current detecting circuit 4 via the torque direction switching circuit 3.

The current detecting circuit 4 as shown in FIG. 1 includes a first comparator $4u1$ and a second comparator $4u2$. The first comparator $4u1$ compares the source-drain voltage of the first output transistor $6u1$ for supplying the output current to the U-phase of the motor 7 with the voltage difference between the reference value INREF and the current control command value INU. Likewise, the second comparator $4u2$ compares the source-drain voltage of the second output transistor $6u2$ for supplying the output current to the U-phase of the motor 7 with the voltage difference between the reference value INREF and the current control command value INU. The outputs of the first and second comparators $4u1$ and $4u2$ are switched in response to the control signal HSINKU supplied from the output transistor switching matrix circuit 11. Thus, a signal COMPU indicating the detection result is supplied to the pre-driver circuit 5.

The first comparator $4u1$ detects the current flowing through the first output transistor $6u1$ when the source-drain voltage of the first output transistor $6u1$ exceeds the voltage difference between the reference value INREF and the current control command value INU. Likewise, the second comparator $4u2$ detects the current flowing through the second output transistor $6u2$ when the source-drain voltage of the second output transistor $6u2$ exceeds the voltage difference between the reference value INREF and the current control command value INU.

The configuration, in which the first comparator $4u1$ detects the current flowing through the first output transistor $6u1$, and the second comparator $4u2$ detects the current flowing through the second output transistor $6u2$, can compensate for the following two factors. The first factor is the input voltage ranges of the first and second comparators $4u1$ and $4u2$ arising from the difference between the first power supply VDD connected to the first output transistor $6u1$ and the second power supply VSS connected to the second output transistor $6u2$. The second factor is the difference in the comparison gain arising from the resistors R1 and R2 as shown in FIG. 1.

The current detecting circuit 4 includes in addition to the first comparator $4u1$, second comparator $4u2$ and resistors R1 and R2 for detecting the U-phase output current, a first comparator $4v1$, second comparator $4v2$ and resistors R1 and R2 for detecting the V-phase output current, and a first comparator $4w1$, second comparator $4w2$ and resistors R1 and R2 for detecting the W-phase output current.

More specifically, the current detecting circuit 4 includes the first comparator $4v1$ and second comparator $4v2$ with the following functions. The first comparator $4v1$ compares the source-drain voltage of the first output transistor $6v1$ for supplying the output current IOUTV to the terminal V of the motor 7 with the voltage difference between the reference value INREF and the current control command value INV. Likewise, the second comparator $4v2$ compares the source-drain voltage of the second output transistor $6v2$ for supplying the output current to the terminal V of the motor 7 with the voltage difference between the reference value INREF and the current control command value INV. The outputs of the first and second comparators $4v1$ and $4v2$ are switched in response to the control signal HSINKV supplied from the output transistor switching matrix circuit 11. Thus, a signal COMPV indicating the detection result is supplied to the pre-driver circuit 5.

Likewise, as for the W-phase, the current detecting circuit 4 includes a first comparator $4w1$ and a second comparator $4w2$. The first comparator $4w1$ compares the source-drain voltage of the first output transistor $6w1$ for supplying the output current IOUTW to the W-phase of the motor 7 with the voltage difference between the reference value INREF and the current control command value TNW. Likewise, the second comparator $4w2$ compares the source-drain voltage of the second output transistor $6w2$ for supplying the output current to the terminal W of the motor 7 with the voltage difference between the reference value INREF and the current control command value INW. The outputs of the first and second comparators $4w1$ and $4w2$ are switched in response to the control signal HSINKW supplied from the output transistor switching matrix circuit 11. Thus, a signal COMPW indicating the detection result is supplied to the pre-driver circuit 5.

The pre-driver circuit 5 sets RS flip-flops $5u$, $5v$ and $5w$ in a specified state in synchronism with the control signal OSC supplied from the output transistor switching matrix circuit 11. The RS flip-flop $5u$ is reset in response to the signal COMPU supplied from the current detecting circuit 4. Likewise, the RS flip-flop $5v$ is reset by the signal COMPV, and the RS flip-flop $5w$ is reset by the signal COMPW.

FIG. 7 is a timing chart illustrating the details of a part of the U-phase operation as shown in FIG. 4. The control signal OSC illustrated in FIG. 7 is generated by the output transistor switching matrix circuit 11 in conjunction with the signals HSINKU, HSINKV and HSINKW, and controls the timing at which the output currents IOUTU, IOUTV and IOUTW are supplied to the motor 7.

The operation of the pre-driver circuit 5 will now be described by way of example of the control of the output current IOUTU supplied to the U-phase of the motor 7. The pre-driver circuit 5 generates a signal GATEU in response to the control signals OSC and HSINKU fed from the output transistor switching matrix circuit 11 and the signal COMPU fed from the current detecting circuit 4. The pre-driver circuit 5 controls the gate voltage of the first output transistor $6u1$ using the signal GATEU in such a manner that the output current IOUTU increases in the direction indicated by the control signal HSINKU. Then, the source-drain voltage of the on-state first output transistor $6u1$ exceeds the voltage difference between the current control command value INU and the reference value INREF. In this case, the pre-driver circuit 5 changes the on-off state of the first and second output transistors $6u1$ and $6u2$ in response to the signal COMPU supplied from the current detecting circuit 4. Subsequently, the pre-driver circuit 5 reduces the output current IOUTU until the control signal OSC indicates "active". When the control signal OSC indicates "active" again, the pre-driver circuit 5 controls the gate voltage of the second output transistor $6u2$ using the signal GATEU it generates, and increases the output current IOUTU in the direction indicated by the control signal HSINKU. Thus, the pre-driver circuit 5 repeats such chopping operation in response to the control signal OSC and control signal HSINKU. The pre-driver circuit 5 carries out the same operation as described above in response to the current control command values INV and INW. In this case, the pre-driver circuit 5 generates the signals GATEV and GATEW in the same manner as the signal GATEU to control the gate voltages of the first and second output transistors $6v1$ and $6v2$, and $6w1$ and $6w2$.

Carrying out the chopping operation, the pre-driver circuit 5 controls the first and second output transistors $6u1$ and $6u2$ to generate the U-phase output current IOUTU with the waveform as shown in FIG. 7. The control as described above is applied to the first output transistors $6u1$, $6v1$ and $6w1$ and second output transistors $6u2$, $6v2$ and $6w2$. Thus, the phases of the motor 7 are supplied with the sinusoidal output currents IOUTU, IOUTV and IOUTW.

As for the operation of the output transistors 6, the switching of the first and second output transistors $6u1$ and $6u2$ in the U-phase, for example, they always carry out the opposite logic operation except for very short duration in which they are both brought out of conduction to prevent the flow-through current from passing through them. Thus, to produce the U-, V- and W-phase output currents TOUTU, IOUTV and IOUTW, such operation is repeated as when the first output transistor is conducting, the second output transistor is nonconducting, and vice versa.

Thus the output currents IOUTU, IOUTV and IOUTW to be supplied to the motor 7 are generated in such a fashion that they assume sinusoidal waveforms just as the corresponding current control command values INU, INV and INW, thereby reducing the driving noise of the motor 7.

Although the description thus far assumes that the current control circuit 2 generates the sinusoidal current control command values INU, INV and INW, this is not essential. For example, trapezoidal current control command values like a current control command value INU2 as shown in FIG. 9 can be generated by varying the resistance ratios of the resistors R11–R16 and R21–R26 of the current control circuit 2. The trapezoidal output currents IOUTU, IOUTV and IOUTW supplied to the phases of the motor 7 can also reduce the motor drive noise.

As described above, the present embodiment 1 is configured such that it generates the output currents IOUTU, IOUTV and IOUTW for driving the motor 7 in response to the current control command values INU, INV and INW the current control circuit 2 generates. Thus, it offers an advantage of being able to reduce the motor driving noise by shaping the output currents in a sinusoidal waveform.

In addition, the present embodiment 1 offers an advantage of being able to reduce the motor driving noise by shaping the current control command values INU, INV and INW in a trapezoidal waveform.

Furthermore, the present embodiment 1 is configured such that the current detecting circuit 4 detects the output currents IOUTU, IOUTV and IOUTW for driving the motor 7 from the source-drain voltages of the on-state first or second output transistors $6u1$, $6v1$ and $6w1$ or $6u2$, $6v2$ and $6w2$. Thus, the present embodiment 1 can turn off the output transistors instantly when any one of the U, V and W terminals of the motor 7 is short-circuited to the first power supply VDD or the second power supply VSS. As a result, it offers an advantage of being able to prevent the apparatus from being destroyed by the short circuit of the power supply via the motor 7.

Embodiment 2

Figure 10:
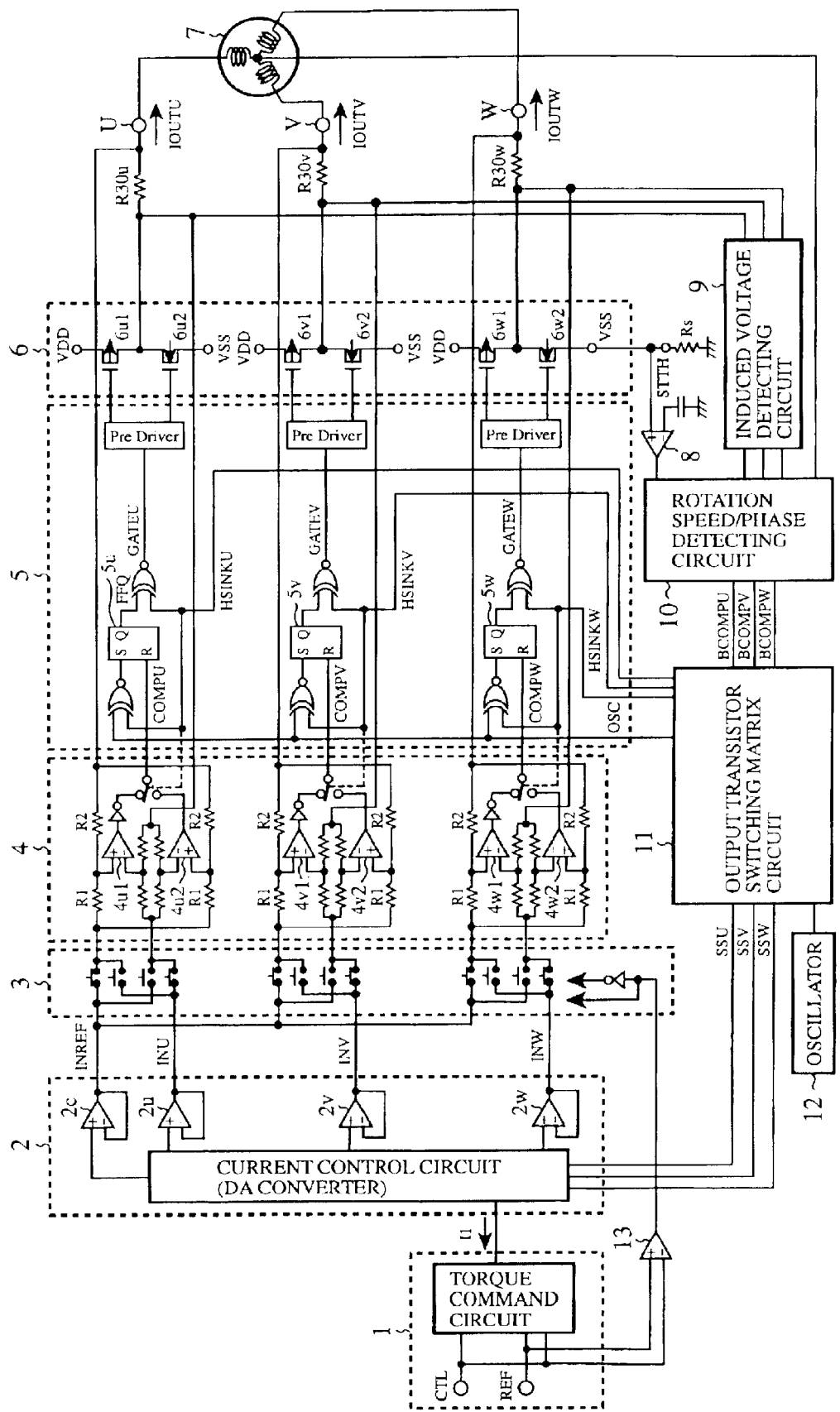
FIG. 10 is a block diagram showing a configuration of an embodiment 2 of the motor driving circuit in accordance with the present invention.

FIG. 10 is a block diagram showing a configuration of an embodiment 2 of the motor driving circuit in accordance with the present invention. In FIG. 10, the same reference numerals as those of FIG. 1 designate the same or like portions, and the description thereof is omitted here. The motor driving circuit as shown in FIG. 10 includes in addition to the configuration of FIG. 1, resistors R30$u$, R30$v$ and R30$w$ for detecting U-, V- and W-phase output currents IOUTU, IOUTV and IOUTW.

The resistor R30$u$ is interposed between the terminal U of the motor 7 and the connection of the first and second output transistors $6u1$ and $6u2$, that is, the output portion of the output currents IOUTU, so that the voltage across the resistor R30$u$ is detected by the resistors R1 and R2 and comparators $4u1$ and $4u2$ of the current detecting circuit 4. The resistor R30$v$ is interposed between the terminal V of the motor 7 and the output portion of the output currents IOUTU at which the first and second output transistors $6v1$ and $6v2$ are connected, so that the voltage across the resistor R30$v$ is detected by the resistors R1 and R2 and comparators $4v1$ and $4v2$ of the current detecting circuit 4. The resistor R30$w$ is interposed between the terminal W of the motor 7 and the output portion of the output currents IOUTW at which the first and second output transistors $6w1$ and $6w2$ are connected, so that the voltage across the resistor R30$w$ is detected by the resistors R1 and R2 and comparators $4w1$ and $4w2$ of the current detecting circuit 4.

Next, the operation of the present embodiment 2 will be described.

The motor driving circuit as shown in FIG. 10 operates in the same manner as its counterpart as shown in FIG. 1 except that it uses the resistors R30$u$, R30$v$ and R30$w$ to detect the output currents IOUTU, IOUTV and IOUTW. Thus, the description of the operation common to the two motor driving circuits will be omitted here.

As described above, the embodiment 2 is configured such that it detects the output currents IOUTU, IOUTV and IOUTW to be supplied to the U, V and W terminals of the motor 7 using the voltages across the resistors R30$u$, R30$v$ and R30w. Accordingly, it offers an advantage of being able to reduce the effect of the absolute variations and temperature variations in the output currents for driving the motor 7.

In addition, the present embodiment 2 is configured such that it generates the output currents IOUTU, IOUTV and IOUTW for driving the motor 7 in response to the current control command values INU, INV and INW generated by the current control circuit 2. Consequently, it offers an advantage of being able to reduce the motor driving noise by shaping the output currents in a sinusoidal waveform.

Furthermore, it offers an advantage of being able to reduce the motor driving noise by shaping the current control command values INU, INV and INW in a trapezoidal waveform.

Embodiment 3

Figure 11:
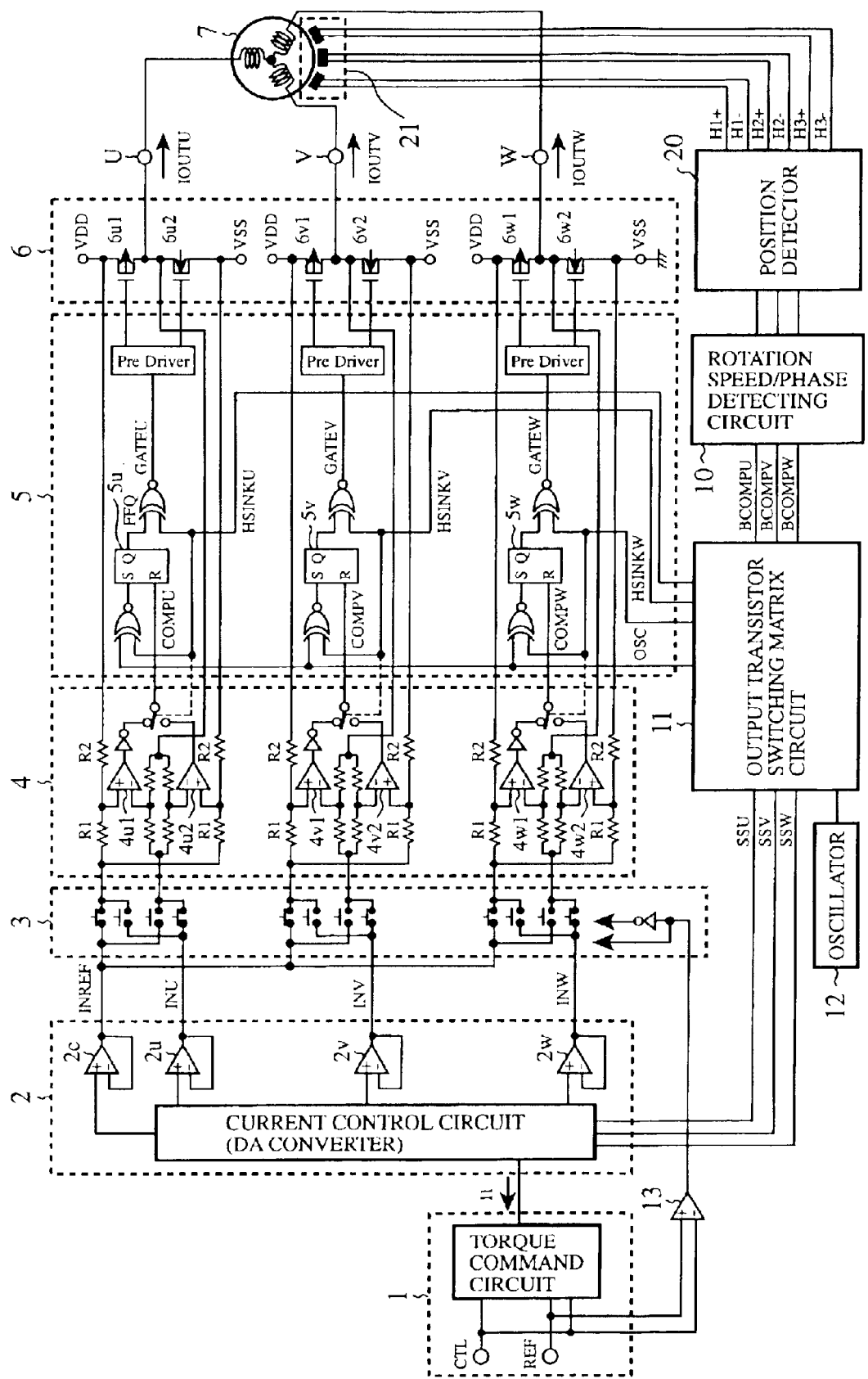
FIG. 11 is a block diagram showing a configuration of an embodiment 3 of the motor driving circuit in accordance with the present invention.

FIG. 11 is a block diagram showing a configuration of an embodiment 3 of the motor driving circuit in accordance with the present invention. In FIG. 11, the same reference numerals as those of FIG. 1 designate the same or like portions, and the description thereof is omitted here. The motor driving circuit as shown in FIG. 11 includes a position detector 20 and Hall elements 21 attached to the motor 7 in place of the induced voltage detecting circuit 9 and starting current detecting circuit 8 as shown in FIG. 1. The position detector 20, receiving the voltage waveforms the Hall elements 21 output, detects the rotor position of the motor 7. The position detector 20 supplies its detection result to the rotation speed/phase detecting circuit 10 which generates the zero-cross signals BCOMP in response to the detection result.

Next, the operation of the present embodiment 3 will be described.

Figure 12:
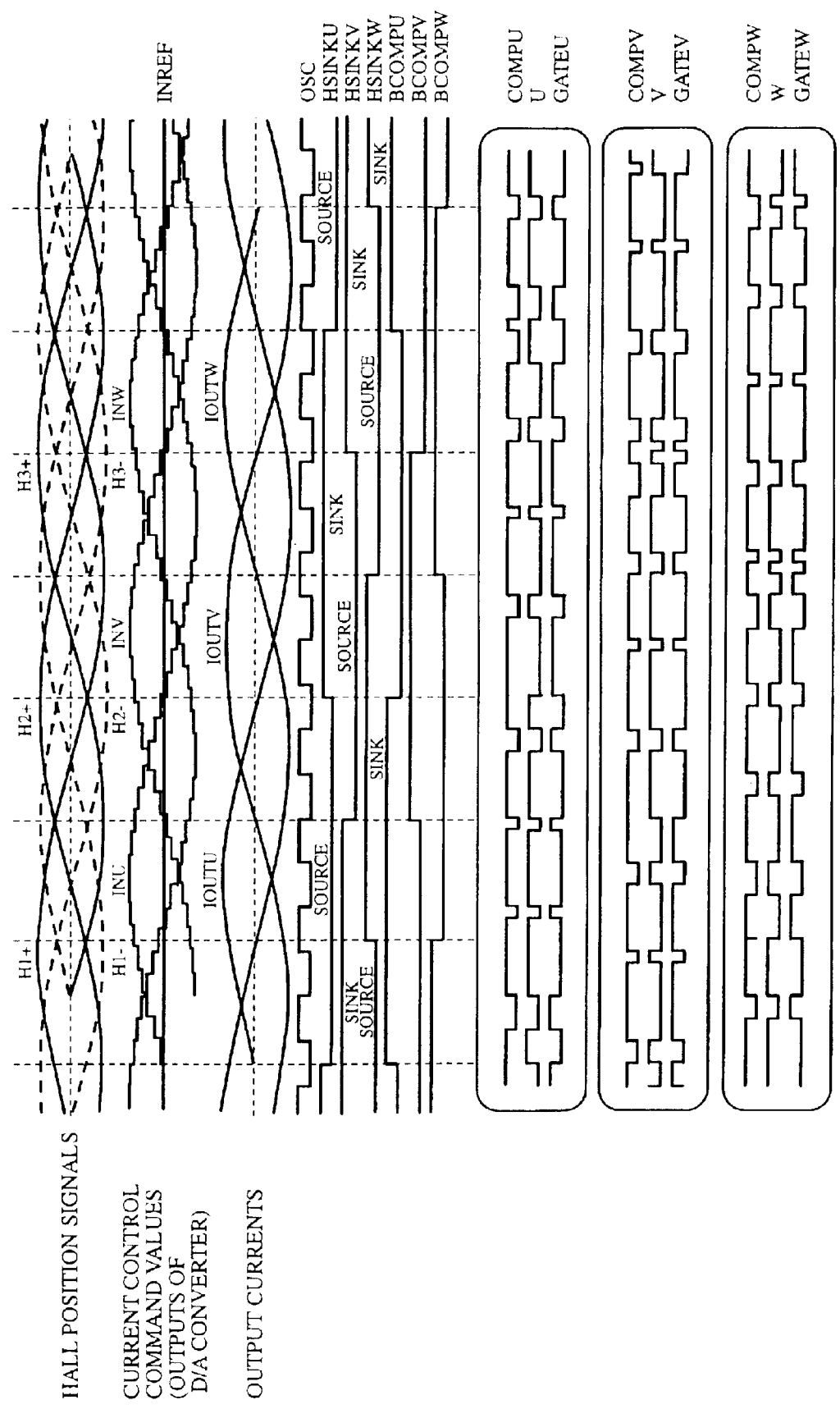
FIG. 12 is a timing chart illustrating the operation of the embodiment 3 of the motor driving circuit.

FIG. 12 is a timing chart illustrating the operation of the embodiment 3 of the motor driving circuit. Here, only the operation characteristic of the motor driving circuit as shown in FIG. 11 will be described without describing the operation common with that of the motor driving circuit as shown in FIG. 1. The Hall elements 21 detect the rotor position of the motor 7, and outputs Hall position signals H1+, H1−, H2+, H2−, H3+and H3− indicating the position of the rotor. When the motor 7 is being driven, the Hall position signals H1+, H1−, H2+, H2−, H3+and H3− have sinusoidal waveforms with their phases being different by 120 degrees as illustrated in FIG. 12.

Generally, the outputs of the Hall elements 21 lead the motor induced voltage by 30 degrees in phase. Accordingly, the position detector 20 as shown in FIG. 11 retards the phases of the Hall position signals H1+, H1−, H2+, H2−, H3+and H3− fed from the Hall elements 21 by 30 degrees to bring the detection result into agreement with the phase of the motor induced voltages. The phase differences between the Hall position signals and the induced voltages are depicted in the timing chart of FIG. 12 as the phase differences between the Hall position signals and the current control command values or output currents. Since the technique for retarding the phases of the Hall position signals by 30 degrees is known, the description thereof is omitted here.

The rotation speed/phase detecting circuit 10 generates the zero-cross signals BCOMP in response to the result the position detector 20 detects, that is, in accordance with the values of the Hall position signals with their phases corrected and the rising or falling tendencies of the Hall position signal waveforms. The other operation is the same as that of the embodiment 1 of the motor driving circuit. Thus, it generates the output currents IOUTU, IOUTV and IOUTW to be supplied to the motor 7 to control it. FIG. 12 illustrates the timings of the signals such as the Hall position signals H1+, H1−, H2+, H2−, H3+and H3− the Hall elements 21 detect, the zero-cross signals BCOMPU, BCOMPV and BCOMPW the rotation speed/phase detecting circuit 10 generates, and output currents IOUTU, IOUTV and IOUTW.

As described above, the present embodiment 3 is configured such that the rotation speed/phase detecting circuit 10 generates the zero-cross signals BCOMP in response to the Hall position signals H1+, H1−, H2+, H2−, H3+and H3− the Hall elements 21 detect, and that it generates the output currents IOUTU, IOUTV and IOUTW for driving the motor 7 in response to the zero-cross signals BCOMP and current control command values INU, INV and INW the current control circuit 2 generates. Consequently, the present embodiment 3 offers an advantage of being able to reduce the motor driving noise by forming the output currents in a sinusoidal waveform.

In addition, it offers an advantage of being able to reduce the motor driving noise by generating the trapezoidal current control command values INU, INV and INW.

Furthermore, the present embodiment 3 is configured such that the current detecting circuit 4 detects the output currents IOUTU, IOUTV and IOUTW for driving the motor 7 from the source-drain voltages of the on-state first output transistors 6u1, 6v1 and 6w1 or second output transistors 6u2, 6v2 and 6w2. Accordingly, if any one of the U, V and W terminals of the motor 7 is short-circuited to the first power supply VDD or second power supply VSS, it can turn off the output transistor instantly. As a result, it offers an advantage of being able to avoid damage because of the short circuit of the power supply via the motor 7.

Embodiment 4

Figure 13:
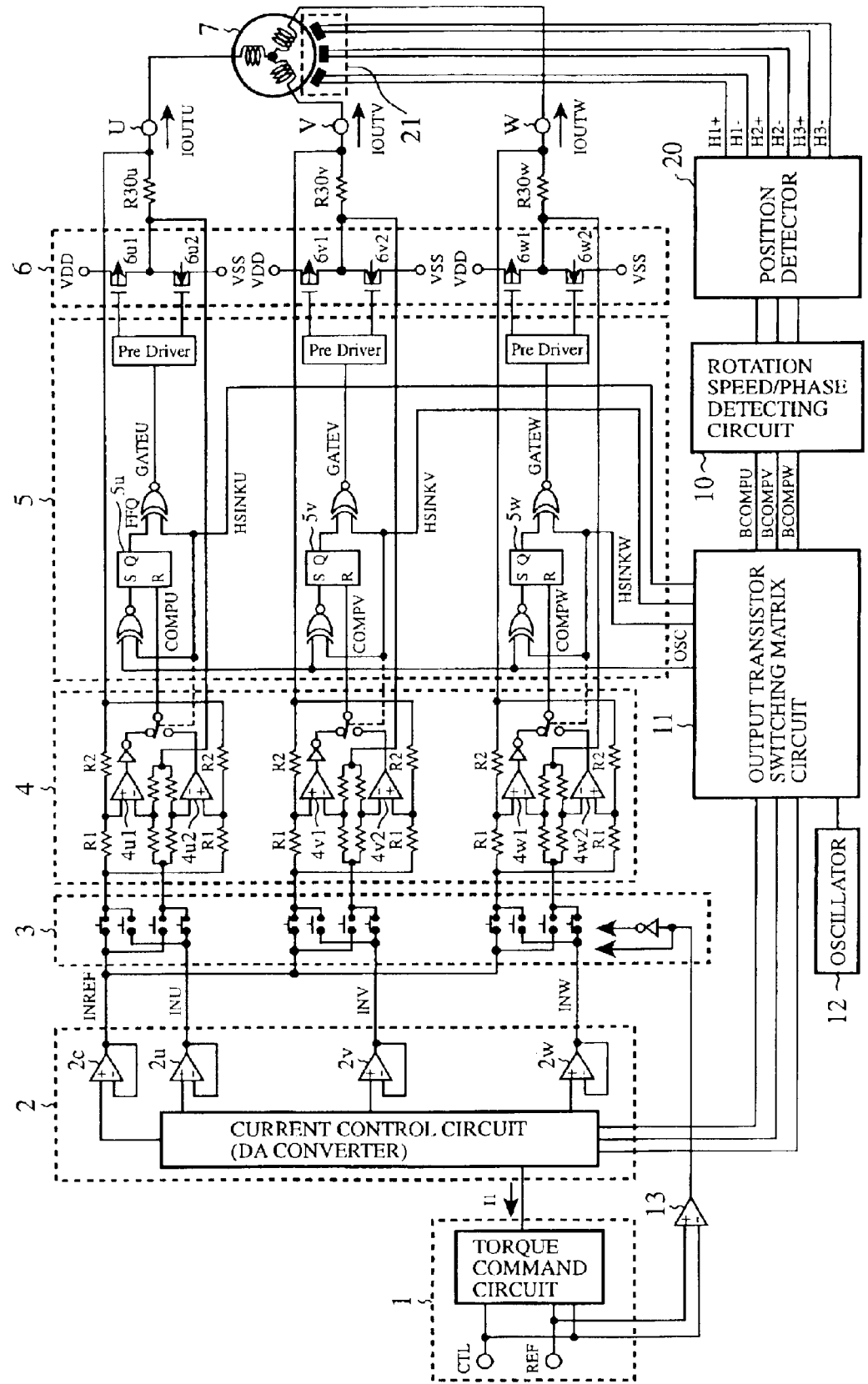
FIG. 13 is a block diagram showing a configuration of an embodiment 4 of the motor driving circuit in accordance with the present invention.

FIG. 13 is a block diagram showing a configuration of an embodiment 4 of the motor driving circuit in accordance with the present invention. In FIG. 13, the same reference numerals as those of FIGS. 10 and 11 designate the same or like portions, and the description thereof is omitted here. The motor driving circuit as shown in FIG. 13 is configured such that it includes the resistors R30u, R30v and R30w as shown in FIG. 10, and that the current detecting circuit 4 detects the output currents IOUTU, IOUTV and IOUTW using the resistors R30u, R30v and R30w. Since the remaining configuration is the same as that of the motor driving circuit as shown FIG. 11, the detailed description thereof is omitted here.

Next, the operation of the present embodiment 4 will be described.

The motor driving circuit as shown in FIG. 13 is the same as the foregoing embodiment 3 of the motor driving circuit as shown in FIGS. 11 and 12 in that the Hall elements 21 detect the position of the rotor of the motor 7, and that the rotation speed/phase detecting circuit 10 generates the zero-cross signals BCOMP in response to the Hall position signals H1+, H1−, H2+, H2−, H3+and H3− obtained as the detection result. In addition, it is the same as the motor driving circuit shown in FIG. 10 in that the current detecting circuit 4 detects the output currents IOUTU, IOUTV and IOUTW from the voltages across the resistors R30u, R30v and R30w to control the pre-driver circuit 5. The remaining operation is the same as that of the foregoing embodiments 1–3 of the motor driving circuit. Hence, the description thereof is omitted here.

As described above, the embodiment 4 is configured such that the rotation speed/phase detecting circuit 10 generates the zero-cross signals BCOMP in response to the Hall position signals H1+, H1−, H2+, H2−, H3+and H3− the Hall elements 21 generate, and that it generates the output currents IOUTU, IOUTV and IOUTW for driving the motor 7 in response to the zero-cross signals BCOMP and the current control command values INU, INV and INW the current control circuit 2 generates. As a result, it offers an advantage of being able to reduce the motor driving noise by shaping the output currents in a sinusoidal waveform.

In addition, it offers an advantage of being able to reduce the motor driving noise by generating the trapezoidal current control command values INU, INV and INW.

Furthermore, the embodiment 4 is configured such that it detects the output currents IOUTU, IOUTV and IOUTW to be supplied to the U, V and W terminals of the motor 7 using the voltages across the resistors R30*u*, R30*v* and R30*w*. Accordingly, it offers an advantage of being able to reduce the effect of the absolute variations and temperature variations in the output currents for driving the motor 7.

Embodiment 5

Figure 14:
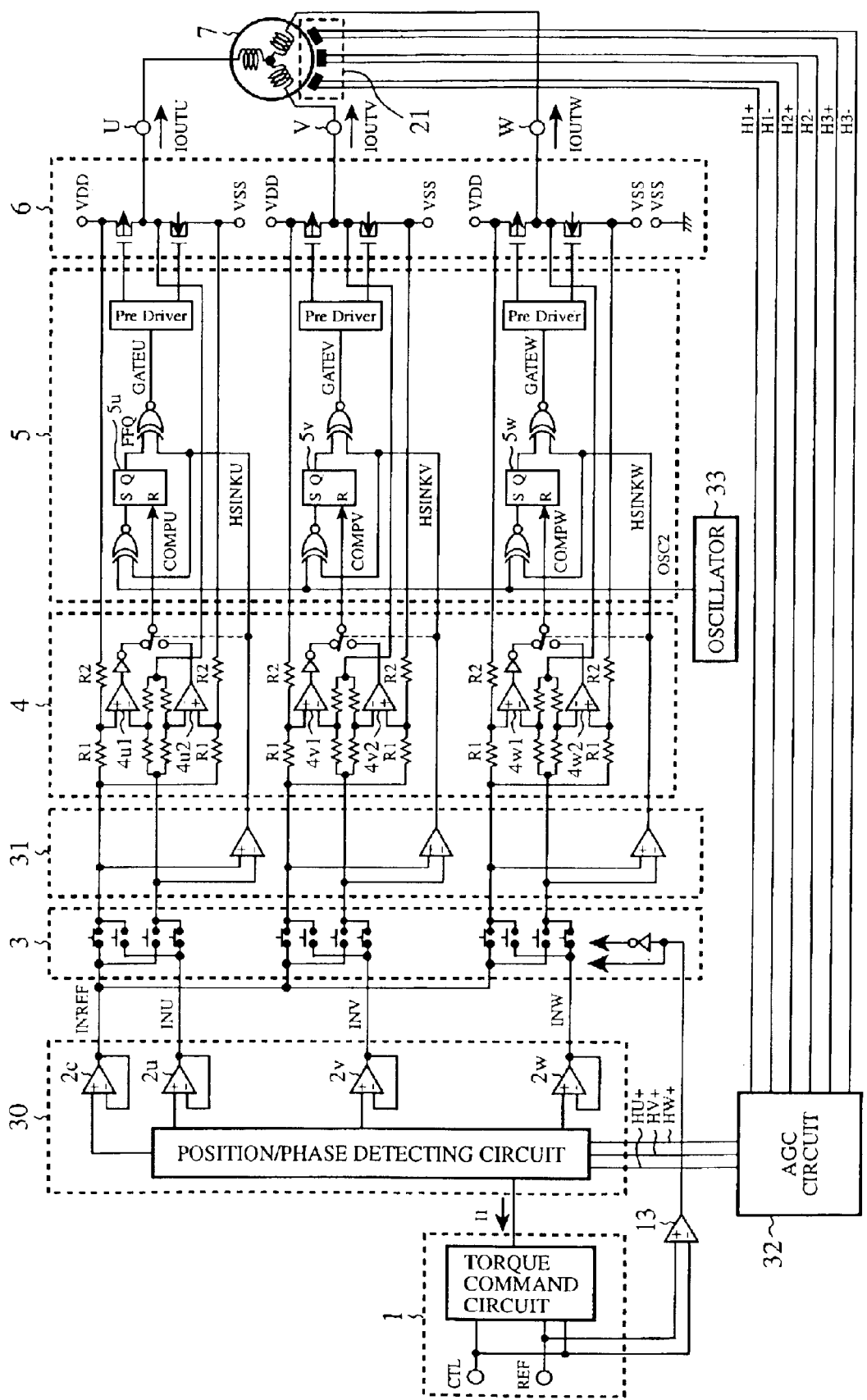
FIG. 14 is a block diagram showing a configuration of an embodiment 5 of the motor driving circuit in accordance with the present invention.

FIG. 14 is a block diagram showing a configuration of an embodiment 5 of the motor driving circuit in accordance with the present invention. In FIG. 14, the same reference numerals as those of FIG. 11 designate the same or like portions, and the description thereof is omitted here. In FIG. 14, a position/phase detecting circuit 30 generates the reference value INREF and the current control command values INU, INV and INW from the gain control signals HU+, HV+and HW+fed from an automatic gain control circuit 32 (called "AGC circuit 32" from now on) under the control of the torque signal I1 fed from the torque command circuit 1. The AGC circuit 32 generates the gain control signals HU+, HV+and HW+from the Hall position signals H1+, H1−, H2+, H2−, H3+and H3− the Hall elements 21 detect.

A comparator 31 generates the control signals HSINK in response to the reference value INREF and current control command values INU, INV and INW supplied from the position/phase detecting circuit 30 via the torque direction switching circuit 3. The control signals HSINK the comparator 31 generates are the same as the control signals HSINK used for controlling the current detecting circuit 4 and pre-driver circuit 5 of the foregoing embodiment 1 of the motor driving circuit, and are used for controlling the current detecting circuit 4 and pre-driver circuit 5 of FIG. 14 in the same manner as described in the embodiment 1. An oscillator 33 generates a control signal OSC2 for controlling the operation of the pre-driver circuit 5, and supplies it to the pre-driver circuit 5. The output transistors 6, motor 7 and comparator 13 are configured in the same fashion as the motor driving circuit as shown in FIG. 1.

Next, the operation of the present embodiment 5 will be described.

The operation common to that of the motor driving circuit of FIGS. 1 and 11 will be omitted, and only the operation characterizing the motor driving circuit shown in FIG. 14 will be described.

Figure 15:
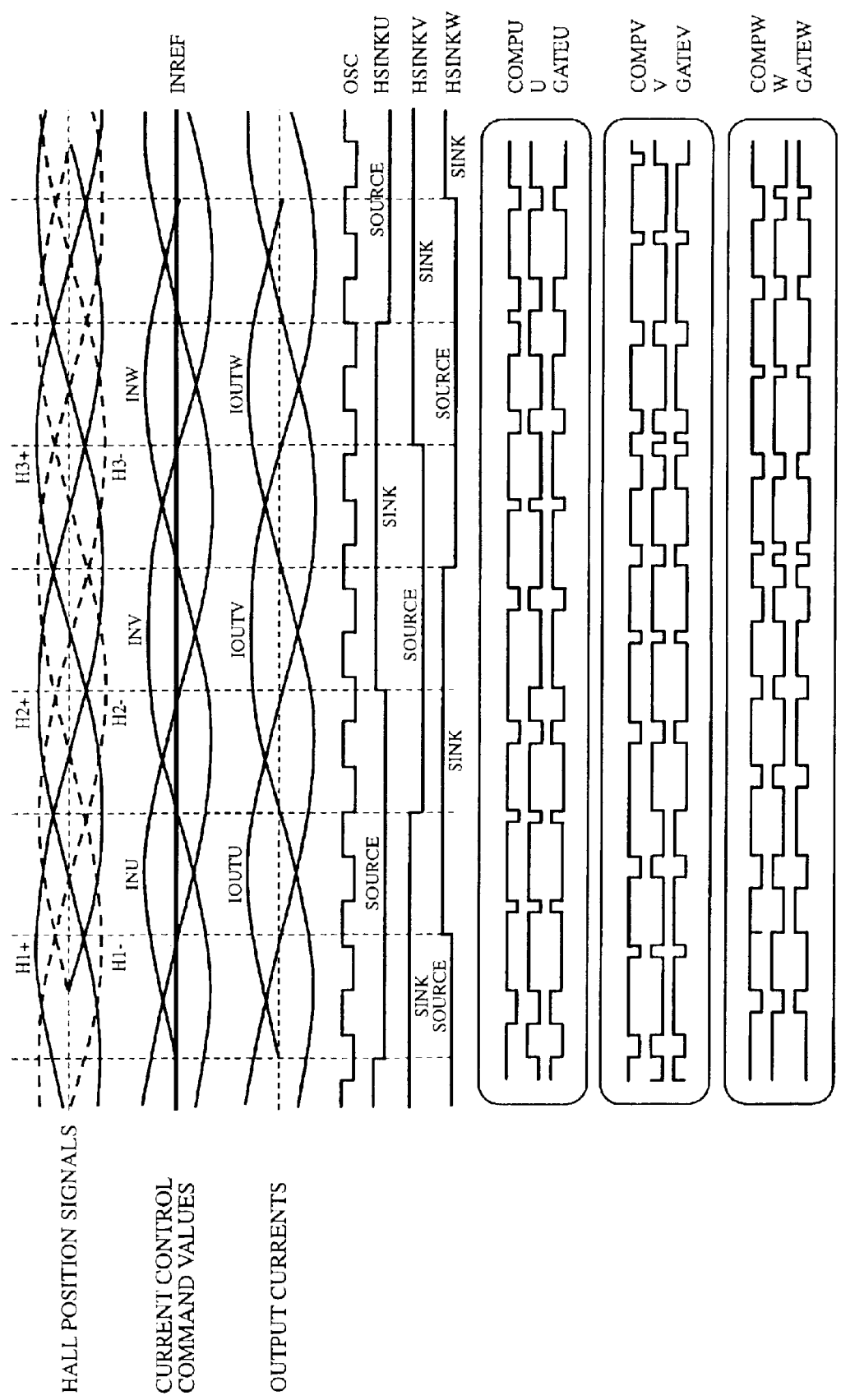
FIG. 15 is a timing chart illustrating the operation of the embodiment 5 of the motor driving circuit.

FIG. 15 is a timing chart illustrating the operation of the embodiment 5 of the motor driving circuit. As in the motor driving circuit as shown in FIG. 11, the Hall elements 21 detect the position of the rotor of the motor 7 that is being driven, and output the detection results as the Hall position signals H1+, H1−, H2+, H2−, H3+and H3−. Receiving them, the AGC circuit 32 adjusts the gain control signals HU+, HV+and HW+in such a manner that the voltage amplitudes of the Hall position signals the Hall elements 21 output become constant, and outputs them. This makes it possible to prevent the variations in the voltage amplitudes the Hall elements 21 output, and to suppress the fluctuations in the voltage amplitudes depending on the temperature. The gain control signals HU+, HV+and HW+the AGC circuit 32 outputs are supplied to the position/phase detecting circuit 30.

Figure 16:
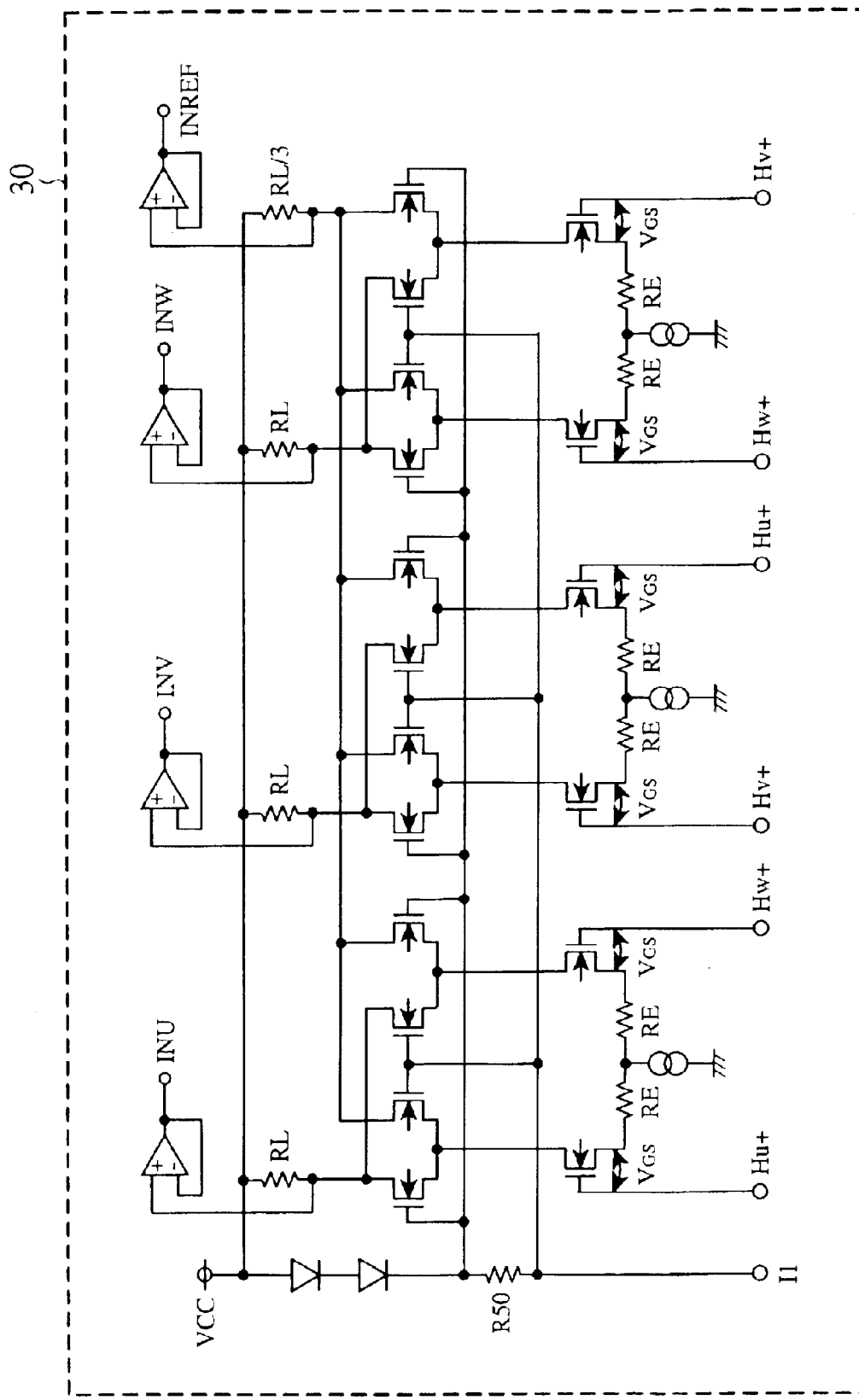
FIG. 16 is a circuit diagram showing a configuration of the position/phase detecting circuit of the embodiment 5.

FIG. 16 is a circuit diagram showing a configuration of the position/phase detecting circuit 30 of the present embodiment 5. The position/phase detecting circuit 30 delays the phases of the voltage waveforms of the Hall position signals the Hall elements 21 output by 30 degrees, and multiplies the phase-retarded voltages by the value of the torque signal I1. The relationships between the current control command values INU, INV and INW and the reference value INREF as illustrated in FIG. 16 are given by the following equations (1)–(3).

$$INU-INREF=RL \times (R50 \times I1) \times K \times (HU+ - HW+) \quad (1)$$

$$INV-INREF=RL \times (R50 \times I1) \times K \times (HV+ - HU+) \quad (2)$$

$$INW-INREF=RL \times (R50 \times I1) \times K \times (HW+ - HV+) \quad (3)$$

where $K=2 \times RE \times (VGS-VTH)$.

Here, the "VGS" is the gate-source voltage of the MOS transistors having their gates supplied with the gain control signals HU+, HW+and HV+as shown in FIG. 16. The "VTH" is the threshold voltage of the n-channel MOS transistors having their gates supplied with the gain control signals HU+, HW+and HV+. The threshold voltage is defined as a voltage at which current begins to flow through their drain and source, and takes a value of about 0.7 V for a common n-channel MOS transistor.

As illustrated in FIG. 16, the position/phase detecting circuit 30 generates the reference value INREF and current control command values INU, INV and INW by combining in a prescribed manner the gain control signals HU+, HV+and HW+the AGC circuit 32 outputs, that is, by combining the specified Hall position signals. The current control command values INU, INV and INW have their phases delayed behind the Hall position signals by 30 degrees as illustrated in FIG. 15, and have a waveform with its amplitude multiplied by the value of the torque signal I1.

The comparator 31, receiving the reference value INREF and current control command values TNU, INV and INW from the position/phase detecting circuit 30 via the torque direction switching circuit 3, compares them in a prescribed combination, and generates the control signals HSINKU, HSINKV and HSINKW as the compared result. In this way, the motor driving circuit as shown in FIG. 14 generates the control signals HSINK that are generated by the output transistor switching matrix circuit 11 in the motor driving circuit as shown in FIG. 1. As described above, the motor driving circuit as shown in FIG. 14 controls the current detecting circuit 4 and pre-driver circuit 5 by the control signals HSINK in the same manner as described in the embodiment 1.

The current detecting circuit 4, pre-driver circuit 5 and output transistors 6 as shown in FIG. 14, generate the sinusoidal output currents IOUTU, IOUTV and IOUTW in the same manner as their counterparts shown in FIG. 1, thereby supplying them to the motor 7.

As described above, the present embodiment 5 is configured such that the AGC circuit 32 generates the gain control signals HU+, HV+and HW+in response to the Hall position signals the Hall elements 21 output, and that the position/phase detecting circuit 30 generates the reference value INREF and current control command values INU, INV and INW using the gain control signals HU+, HV+, HW+. As a result, it offers an advantage of being able to generate the output voltages IOUTU, IOUTV and IOUTW with a sinusoidal waveform as smooth as the Hall position signals the Hall elements 21 output, and hence to reduce the driving noise of the motor 7.

Embodiment 6

Figure 17:
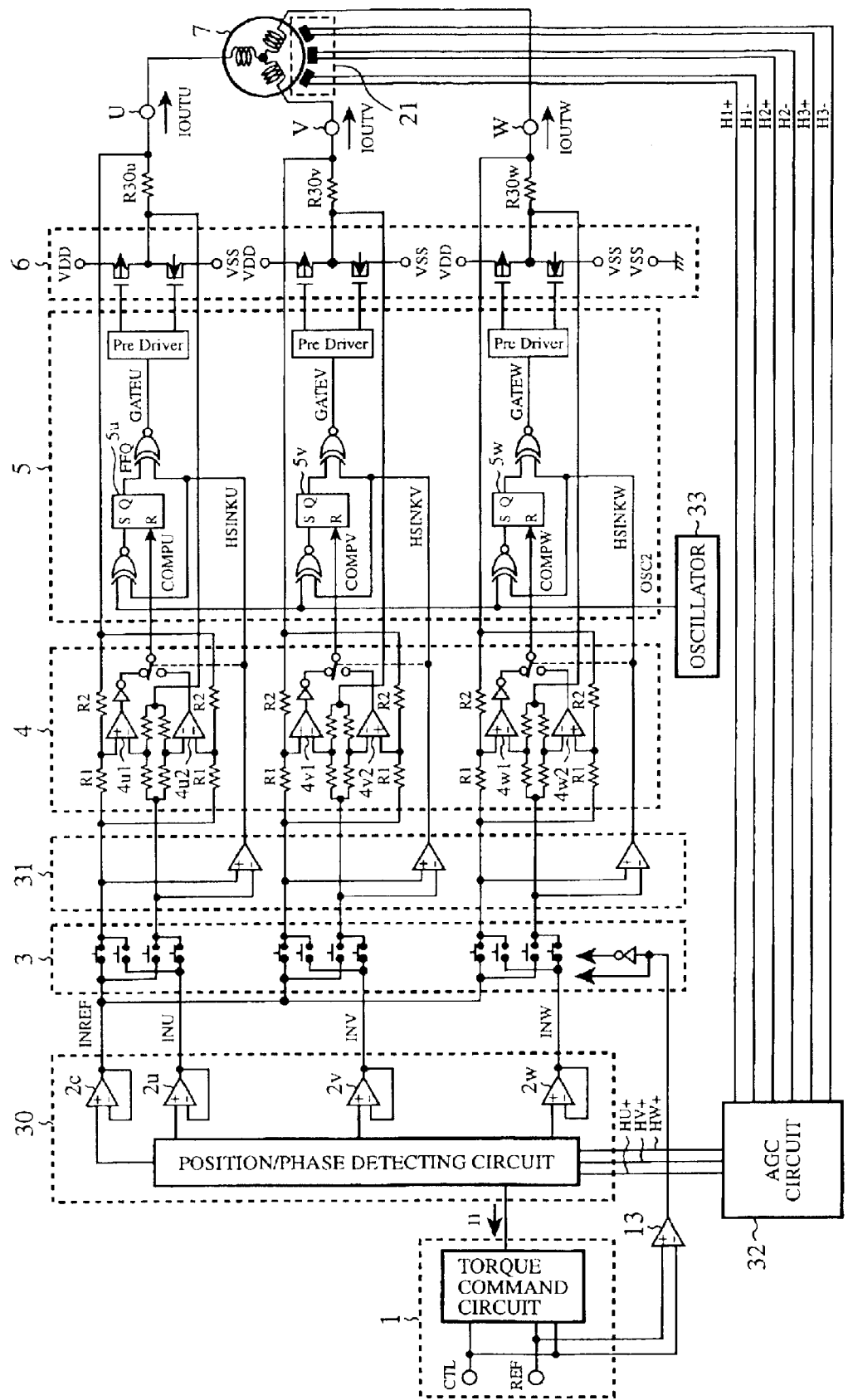
FIG. 17 is a block diagram showing a configuration of an embodiment 6 of the motor driving circuit in accordance with the present invention.

FIG. 17 is a block diagram showing a configuration of an embodiment 6 of the motor driving circuit in accordance with the present invention. In FIG. 17, the same reference numerals as those of FIGS. 10 and 14 designate the same or like portions, and the description thereof is omitted here. The motor driving circuit as shown in FIG. 17 adds to the motor driving circuit as shown in FIG. 14 the resistors R30u, R30v and R30w used for detecting the currents as shown in FIG. 10, the details of which will be omitted here.

Next, the operation of the present embodiment 6 will be described.

The motor driving circuit as shown in FIG. 17 is configured in the same fashion as the embodiment 5 of the motor driving circuit as shown in FIGS. 14 and 15 in that the AGC circuit 32 generates the gain control signals HU+, HV+and HW+in response to the Hall position signals the Hall elements 21 output, and that the position/phase detecting circuit 30 generates the reference value INREF and current control command values INU, INV and INW in response to the gain control signals HU+, HV+and HW+and the torque signal I1 the torque command circuit 1 controls. In addition, the comparator 31 generates the control signals HSINK for controlling the current detecting circuit 4 and pre-driver circuit 5 from the reference value INREF and current control command values INU, INV and INW. Furthermore, as the motor driving circuit as shown in FIG. 10, the current detecting circuit 4 detects the output currents IOUTU, IOUTV and IOUTW from the voltages across the resistors R30u, R30v and R30w to control the pre-driver circuit 5. Since the remaining operation is the same as that of the embodiment 1 of the motor driving circuit, the description thereof will be omitted here.

As described above, the embodiment 6 is configured such that the AGC circuit 32 generates the gain control signals HU+, HV+and HW+in response to the Hall position signals the Hall elements 21 output, and that the position/phase detecting circuit 30 generates the reference value INREF and current control command values INU, INV and INW from the gain control signals HU+, HV+and HW+. Accordingly, the present embodiment 6 can generate the output voltages IOUTU, IOUTV and IOUTW with a sinusoidal waveform as smooth as the Hall position signals the Hall elements 21 output, thereby offering an advantage of being able to reduce the driving noise of the motor 7.

In addition, the present embodiment 6 is configured such that it detects the output currents IOUTU, IOUTV and IOUTW to be supplied to the U, V and W terminals of the motor 7 using the voltages across the resistors R30u, R30v and R30w. Accordingly, it offers an advantage of being able to reduce the effect of the absolute variations and temperature variations in the output currents for driving the motor 7.

What is claimed is:

1. A motor driving circuit comprising:

position detecting means for detecting a position of a rotor of a motor from induced voltages in the motor;

output means for outputting output currents for driving the motor in response to detection result of said position detecting means;

control signal generating means for generating a plurality of control signals used for controlling the output currents in response to the detection result of said position detecting means;

current control means for generating current control command signals to be compared with the output currents in response to the control signals said control signal generating means outputs;

current detecting means for detecting the output currents that are driving the motor, and for generating comparison detection signals in response to detection result of said current detecting means and to the current control command signals; and output control means for controlling said output means in response to the comparison detection signals.

2. A motor driving circuit comprising:

position detecting means for detecting a position of a rotor of a motor with Hall elements;

output means for outputting output currents for driving the motor in response to detection result of said position detecting means;

control signal generating means for generating a plurality of control signals used for controlling the output currents by correcting phases of the detection result of said position detecting means;

current control means for generating current control command signals to be compared with the output currents in response to the control signals said control signal generating means outputs;

current detecting means for detecting the output currents that are driving the motor, and for generating comparison detection signals in response to detection result of said current detecting means and to the current control command signals; and output control means for controlling said output means in response to the comparison detection signals.

3. A motor driving circuit comprising:

position detecting means for detecting a position of a rotor of a three-phase motor with Hall elements;

output means for outputting output currents for driving the motor in response to detection result of said position detecting means;

control signal generating means for generating three-phase control signals, each of which corresponds to one of phases of the three-phase motor, by correcting phases of the detection result of said position detecting means;

current control means for generating current control command signals to be compared with the output currents by combining in a specified manner the three-phase control signals said control signal generating means outputs;

current detecting means for detecting the output currents that are driving the motor, and for generating current comparison signals in response to detection result of said current detecting means and to the current control command signals; and output control means for controlling said output means in response to the current comparison signals.

4. The motor driving circuit according to claim 1, wherein said current detecting means detects voltages at specified portions of said output means, which voltages indicate the output currents, and generates the comparison detection signals by comparing the current control command signals with the voltages at the specified portions of said output means.

5. The motor driving circuit according to claim 2, wherein said current detecting means detects voltages at specified portions of said output means, which voltages indicate the output currents, and generates the comparison detection signals by comparing the current control command signals with the voltages at the specified portions of said output means.

6. The motor driving circuit according to claim 3, wherein said current detecting means detects voltages at specified portions of said output means, which voltages indicate the output currents, and generates the comparison detection signals by comparing the current control command signals with the voltages at the specified portions of said output means.

7. The motor driving circuit according to claim 1, further comprising resistors for detecting the output currents between said output means and the motor, wherein said current detecting means detects voltages across said resistors, and generates the comparison detection signals by comparing the current control command signals with the voltages across said resistors.

8. The motor driving circuit according to claim 2, further comprising resistors for detecting the output currents between said output means and the motor, wherein said current detecting means detects voltages across said resistors, and generates the comparison detection signals by comparing the current control command signals with the voltages across said resistors.

9. The motor driving circuit according to claim 3, further comprising resistors for detecting the output currents between said output means and the motor, wherein said current detecting means detects voltages across said resistors, and generates the comparison detection signals by comparing the current control command signals with the voltages across said resistors.

* * * * *